United States Patent [19]
Laver

[11] Patent Number: 6,113,980
[45] Date of Patent: *Sep. 5, 2000

[54] METHOD FOR IMPROVING THE CHARGEABILITY OF A POWDER COATING COMPOSITION

[75] Inventor: Hugh Stephen Laver, Reinach, Switzerland

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,521

[22] Filed: Jan. 30, 1998

[30] Foreign Application Priority Data

Jan. 31, 1997 [EP] European Pat. Off. ............... 98710046

[51] Int. Cl.$^7$ .................................. B05D 5/10; C08K 5/34
[52] U.S. Cl. ...................... 427/207.1; 525/421; 525/437; 525/438; 525/440; 524/86; 524/91; 524/99; 524/100; 524/261; 524/284; 524/356; 427/385.1; 427/385.5; 427/386; 427/387; 427/388.2; 427/487
[58] Field of Search ..................................... 525/421, 437, 525/438, 440; 524/86, 91, 99, 100, 261, 284, 356; 427/487, 207.1, 385.5, 386, 387, 388.2

[56] References Cited

U.S. PATENT DOCUMENTS 4,402,983  9/1983  Crauen .

FOREIGN PATENT DOCUMENTS 0371528  11/1989  European Pat. Off. .
2267499  12/1993  United Kingdom .
9212210   7/1992  WIPO .

OTHER PUBLICATIONS

Derwent Abstract 87–222033/32.

Derwent Abstract 85–279382/45.

Derwent Abstract 85–279383/45.

*Primary Examiner*—Samuel A. Acquah
*Attorney, Agent, or Firm*—Luther A. R. Hall

[57] ABSTRACT

A method for improving the chargeability of a powder coating composition containing an organic film-forming binder, which method comprises incorporating into the powder coating composition at least two different compounds containing a residue of the formula (A)

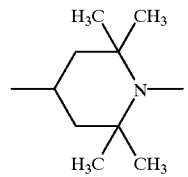

(A)

as electron donors.

15 Claims, No Drawings

METHOD FOR IMPROVING THE CHARGEABILITY OF A POWDER COATING COMPOSITION

This invention relates to a method for improving the chargeability of a powder coating composition.

When powder coatings are applied onto a substrate by electrostatic charging techniques, it is common practice to add to the powder coating formulation a charge control agent which is usually an electron donor, as is taught by Weigel in DE-A-3 600 395. In practice, sterically hindered amines have been found to be the additives of choice for polyesters (EP-A-371 528). Compounds such as Tinuvin® 770 or Chimassorb® 944 have been found to be charge control agents in electrostatic image developing toners as described in JP-A-60/188 958 (Derwent 85-279 382/45) and JP-A-60/188 959 (Derwent 85-279 383/45). Sterically hindered amines in powder top coats for automotive use are described in U.S. Pat. No. 4,402,983.

GB-A-2 267 499 discloses 2,2,6,6-tetramethylpiperidinyl derivatives as stabilizers for powder coating compositions.

Acid catalyzed lacquer systems containing 2,2,6,6-tetramethylpiperidinyl derivatives as light stabilizers are described in WO-A-92/12201.

In more detail, the present invention relates to a method for improving the chargeability of a powder coating composition containing an organic film-forming binder, which method comprises incorporating into the powder coating composition an effective amount of at least two different compounds containing a residue of the formula (A)

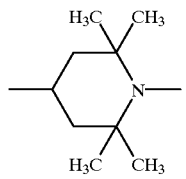

(A)

as electron donors.

The two different compounds containing a residue of the formula (A) are preferably selected from the group consisting of the classes a) a compound of the formula (Ia) or (Ib)

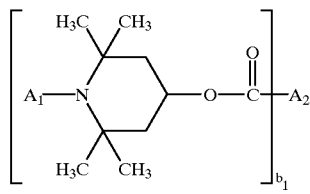

(Ia)

in which
$A_1$ is hydrogen, $C_1$–$C_8$alkyl or $C_3$–$C_6$alkenyl,
$b_1$ is 1, 2 or 4,
if $b_1$ is 1, $A_2$ is $C_1$–$C_9$alkyl,
if $b_1$ is 2, $A_2$ is $C_1$–$C_{10}$alkylene or a group of the formula

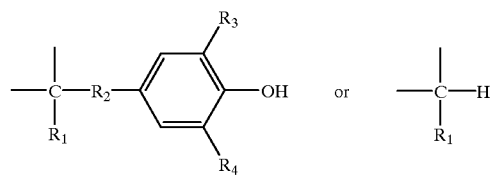

wherein $R_1$ is $C_1$–$C_{10}$alkyl or $C_2$–$C_{10}$alkenyl, $R_2$ is $C_1$–$C_{10}$alkylene and $R_3$ and $R_4$ are independently of one another $C_1$–$C_4$alkyl, cyclohexyl or methylcyclohexyl, and if $b_1$ is 4, $A_2$ is $C_4$–$C_{10}$alkanetetrayl;

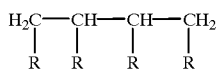

(Ib)

in which
the radicals R independently of one another are —COO—($C_1$–$C_{20}$alkyl) or a group

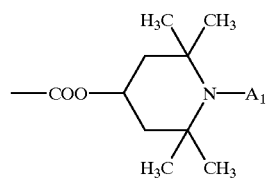

with $A_1$ being as defined above;
b) a compound of the formula (II)

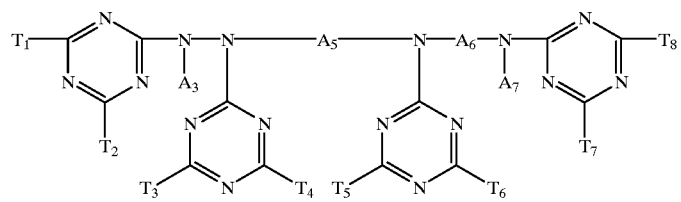

(II)

in which $A_3$ and $A_7$ independently of one another are hydrogen or $C_1$–$C_{12}$alkyl, $A_4$, $A_5$ and $A_6$ independently of one another are $C_2$–$C_{10}$alkylene and $T_1$, $T_2$, $T_3$, $T_4$, $T_5$, $T_6$, $T_7$ and $T_8$ independently of one another are a group of the formula (III)

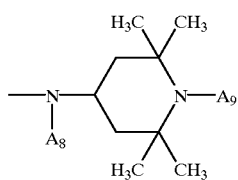
(III)

in which $A_8$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl or a group of the formula (IV)

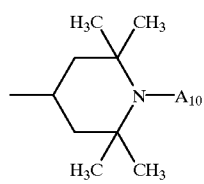
(IV)

and $A_9$ and $A_{10}$ independently of one another are as defined for $A_1$;

c) a compound of the formula (V)

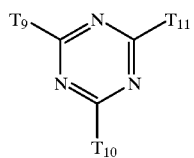
(V)

in which $T_9$, $T_{10}$ and $T_{11}$ independently of one another are a group of the formula (III);

d) a compound of the formula (VI)

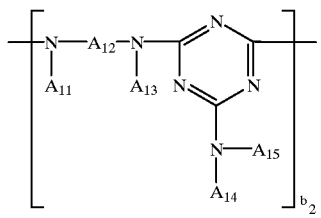
(VI)

in which $A_{11}$, $A_{13}$, $A_{14}$ and $A_{15}$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl or a group of the formula (IV), $A_{12}$ is $C_2$–$C_{10}$alkylene, $C_5$–$C_7$cycloalkylene or $C_1$–$C_4$alkylenedi($C_5$–$C_7$cycloalkylene), or the radicals $A_{11}$, $A_{12}$ and $A_{13}$, together with the nitrogen atoms to which they are attached, form a 5- to 10-membered heterocyclic ring, or $A_{14}$ and $A_{15}$, together with the nitrogen atom to which they are attached, form a 5- to 10-membered heterocyclic ring, $b_2$ is a number from 2 to 50 and at least one of the radicals $A_{11}$, $A_{13}$, $A_{14}$ and $A_{15}$ is a group of the formula (IV);

e) a compound of the formula (VII)

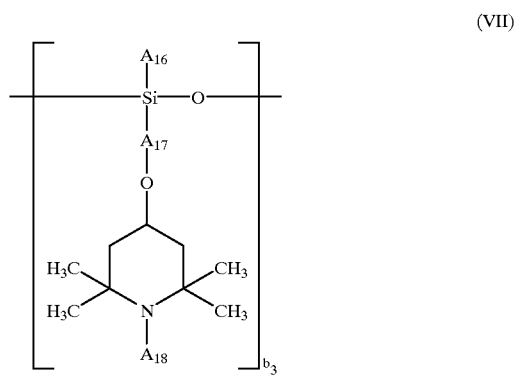
(VII)

in which $A_{16}$ is $C_1$–$C_{10}$alkyl, $C_5$–$C_{12}$cycloalkyl, $C_1$–$C_4$alkyl-substituted $C_5$–$C_{12}$cycloalkyl or phenyl, $A_{17}$ is $C_3$–$C_{10}$alkylene, $A_{18}$ is as defined for $A_1$ and $b_3$ is a number from 1 to 50;

f) a product obtainable by reacting an intermediate product, obtained by reaction of a polyamine of the formula (VIII-a) with cyanuric chloride, with a compound of the formula (VIII-b)

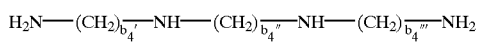
(VIII-a)

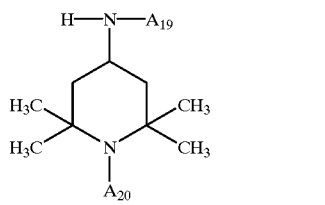
(VIII-b)

in which $b_4'$, $b_4''$ and $b_4'''$ independently of one another are a number from 2 to 12, $A_{19}$ is hydrogen, $C_1$–$C_{12}$alkyl, $C_5$–$C_{12}$cycloalkyl or phenyl and $A_{20}$ is as defined for $A_1$;

g) a compound of the formula (IX)

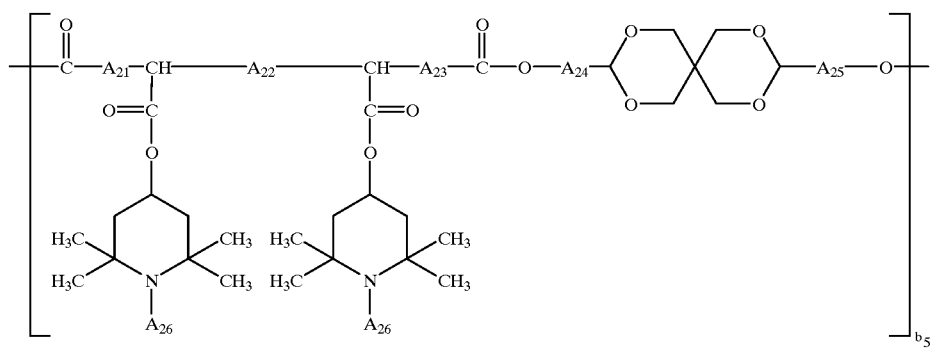

in which $A_{21}$, $A_{22}$, $A_{23}$, $A_{24}$ and $A_{25}$ independently of one another are a direct bond or $C_1$–$C_{10}$alkylene,
$A_{26}$ is as defined for $A_1$ and
$b_5$ is a number from 1 to 50;

h) a compound of the formula (X)

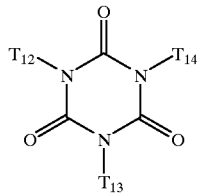

in which
$T_{12}$, $T_{13}$ and $T_{14}$ independently of one another are a group of the formula (XI)

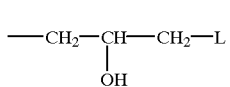

in which L is a group of the formula (III);

i) a compound of the formula (XII)

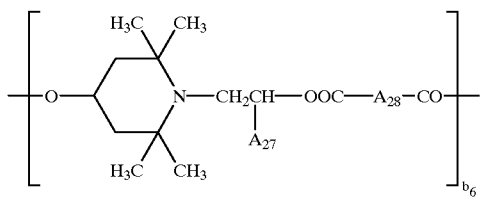

in which $A_{27}$ is hydrogen or methyl,
$A_{28}$ is a direct bond or $C_1$–$C_{10}$alkylene and
$b_6$ is a number from 2 to 50;

j) a compound of the formula (XIII)

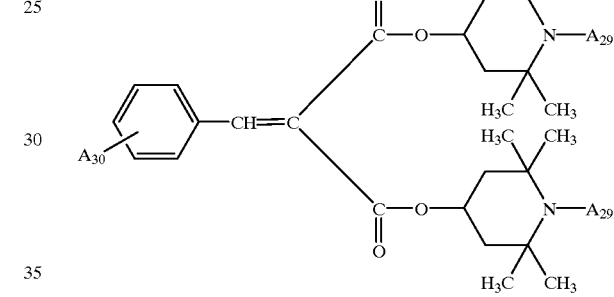

wherein $A_{29}$ is as defined for $A_1$ and
$A_{30}$ is hydrogen, $C_1$–$C_{12}$alkyl or $C_1$–$C_{12}$alkoxy;

k) a compound of the formula (XIV)

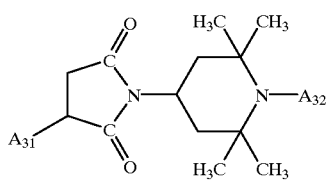

wherein $A_{31}$ is $C_1$–$C_{24}$alkyl and
$A_{32}$ is as defined for $A_1$; and l) a compound of the formula (XV)

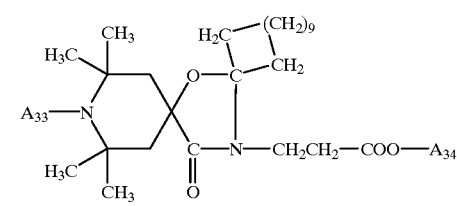

wherein $A_{33}$ is as defined for $A_1$ and $A_{34}$ is $C_1$–$C_{20}$alkyl or $C_2$–$C_{20}$alkenyl.

The two different compounds containing a residue of the formula (A) are preferably not covered by the same class.

Examples of alkyl having up to 24 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl and 1,1,3,3,5,5-hexamethylhexyl. One of the preferred meanings of $A_1$, $A_8$, $A_9$, $A_{10}$, $A_{16}$, $A_{18}$, $A_{19}$, $A_{20}$, $A_{26}$, $A_{29}$ and $A_{32}$ $C_1$–$C_4$alkyl, in particular methyl.

A preferred meaning of $A_{31}$, is dodecyl.

A preferred meaning of R is —COO—($C_{10}$–$C_{18}$alkyl), in particular —COO—$C_{13}H_{27}$.

Examples of $C_1$–$C_{12}$alkoxy are methoxy, ethoxy, propoxy, isopropoxy, butoxy, isobutoxy, pentoxy, isopentoxy, hexoxy, heptoxy, octoxy, decyloxy and dodecyloxy. $C_1$–$C_4$alkoxy, in particular methoxy, is preferred.

Examples of alkenyl having up to 20 carbon atoms are allyl, 2-methallyl, butenyl, pentenyl and hexenyl. The carbon atom in position 1 is preferably saturated.

Examples of $C_5$–$C_{12}$cycloalkyl are cyclopentyl, cyclohexyl, cycloheptyl, cyclooctyl and cyclododecyl. $C_5$–$C_8$cycloalkyl, in particular cyclohexyl, is preferred.

$C_1$–$C_4$Alkyl-substituted $C_5$–$C_{12}$cycloalkyl is, for example, methylcyclohexyl or dimethylcyclohexyl.

Examples of alkylene having up to 10 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_5$–$C_7$cycloalkylene is cyclohexylene.

An example of $C_1$–$C_4$alkylenedi($C_5$–$C_7$cycloalkylene) is cyclohexylene-methylene-cyclohexylene.

Where the radicals $A_{11}$, $A_{12}$ and $A_{13}$, together with the nitrogen atoms to which they are attached, form a 5- to 10-membered heterocyclic ring, this ring is for example

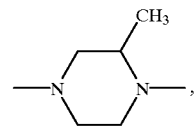

or

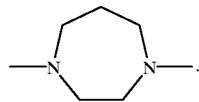

A 6-membered heterocyclic ring is preferred.

Where the radicals $A_{14}$ and $A_{15}$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

An example of $C_1$–$C_4$alkanetetrayl is 1,2,3,4-butanetetrayl.

$b_2$ is preferably a number from 2 to 25.

$b_3$ is preferably a number from 2 to 25, especially 2 to 20 or 2 to 10.

$b_4'$, $b_4''$ and $b_4'''$ are preferably a number from 2 to 4, in particular 2 or 3.

$b_5$ is preferably a number from 1 to 25, especially 1 to 20 or 1 to 10.

$b_6$ is preferably a number from 2 to 25, especially 2 to 20 or 2 to 10.

$A_1$, $A_9$, $A_{10}$, $A_{18}$, $A_{20}$, $A_{26}$, $A_{29}$ and $A_{32}$ are preferably hydrogen or $C_1$–$C_4$alkyl, in particular hydrogen or methyl.

Preferred examples of a compound of the formula (Ia) are:

(Ia-1)

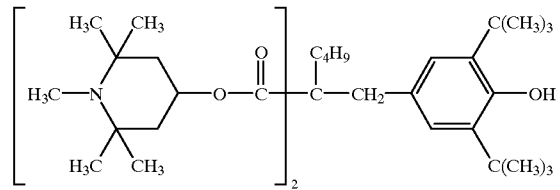

(Ia-2)

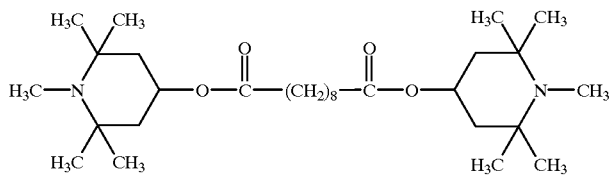

-continued
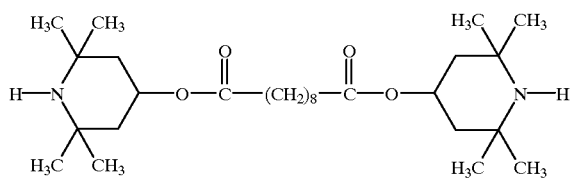
(Ia-3)
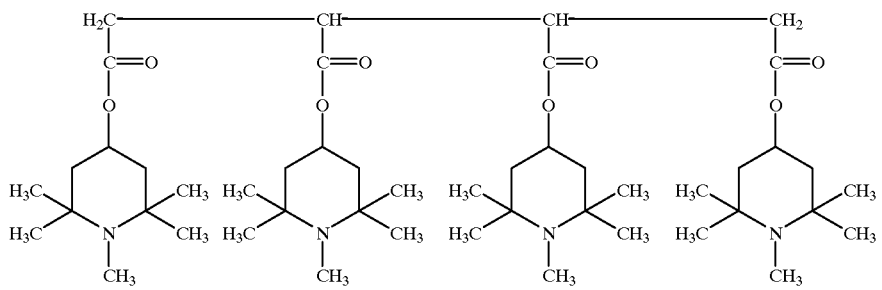
(Ia-4)
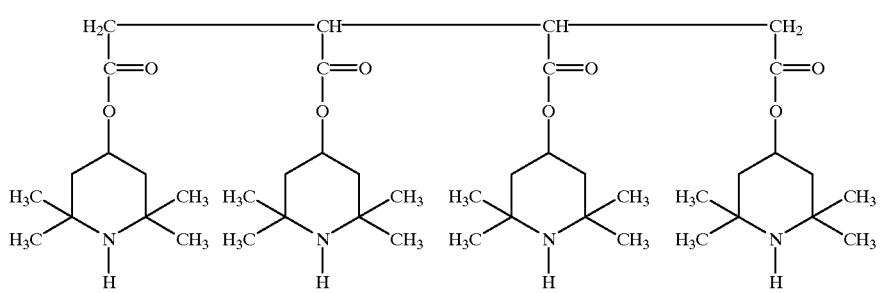
(Ia-5)
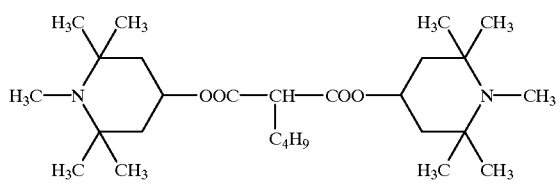
(Ia-6)
Preferred examples of a compound of the formula (Ib) are:
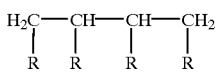
(Ib-1)
in which the radicals R are —COO—$C_{13}H_{27}$ and
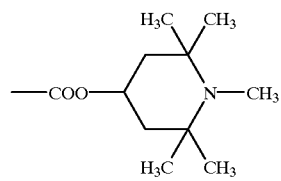
in a ratio of 1.7:2.3,
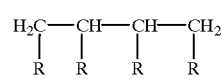
(Ib-2)
in which the radicals R are —COO—$C_{13}H_{27}$ and
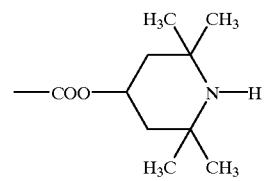
in a ratio of 1.7:2.3.

A preferred example of a compound of the formula (II) is:
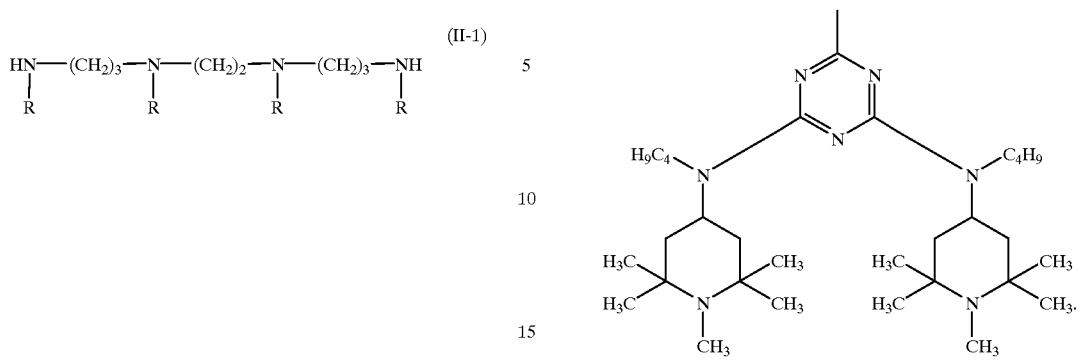
with R being the group
Preferred examples of a compound of the formula (VI) are:
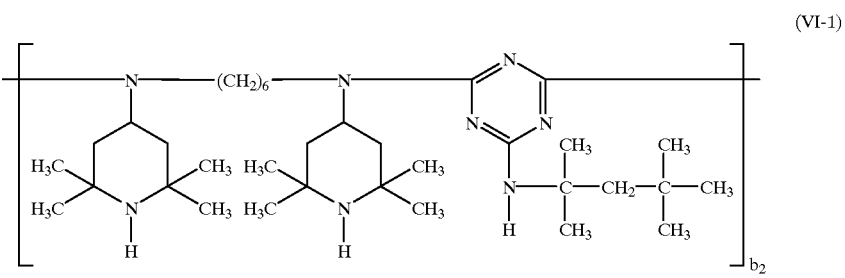
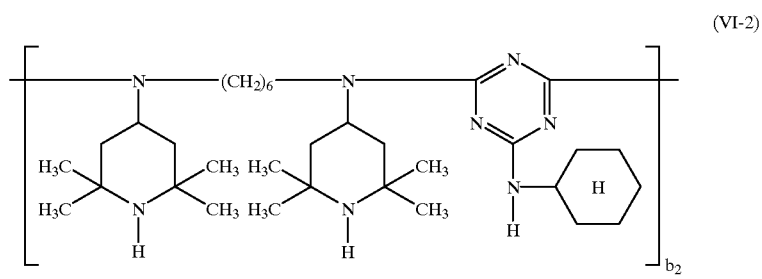
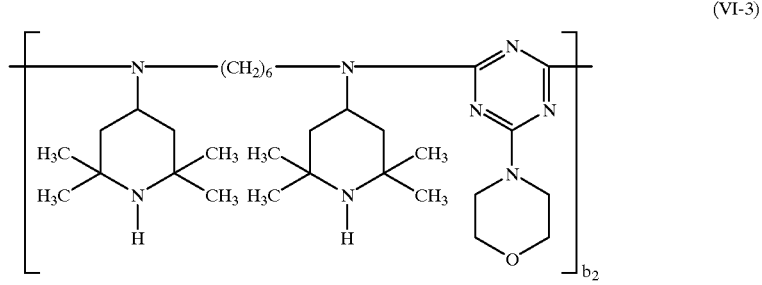

with $b_2$ being a number from 2 to 25.
A preferred example of a compound of the formula (VII) is:
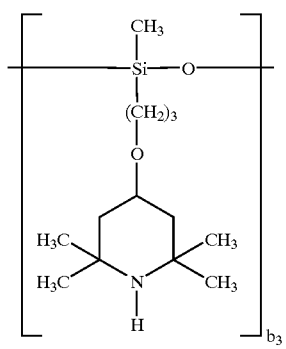
(VII-1)
with $b_3$ being a number from 2 to 25.
A preferred example of a compound of the formula (VIII-a) is
and a preferred example of a compound of the formula (VIII-b) is
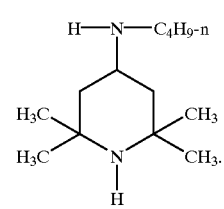
Preferred examples of a compound of the formula (IX) are:
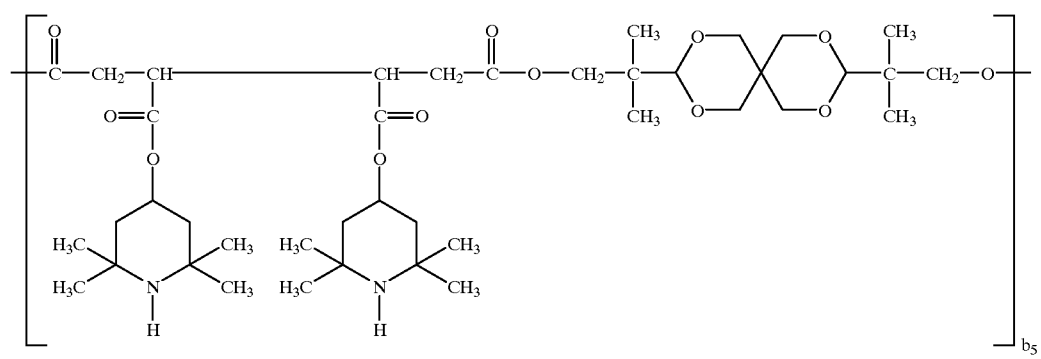
(IX-1)
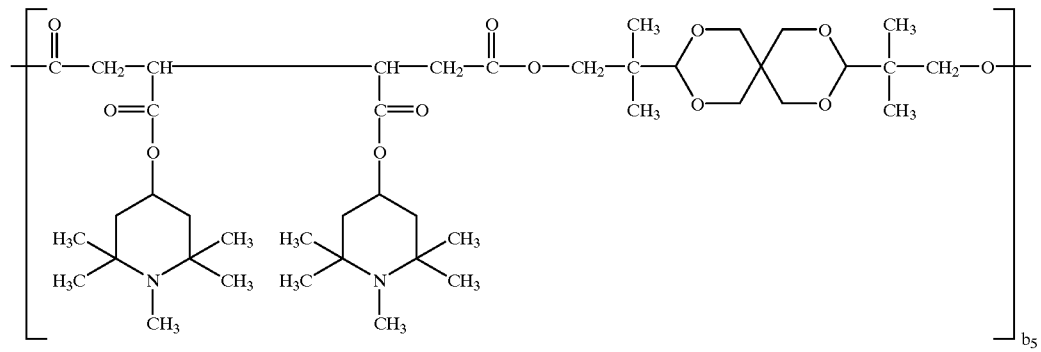
(IX-2)

with $b_5$ being a number from 1 to 20.

A preferred example of a compound of the formula (X) is:

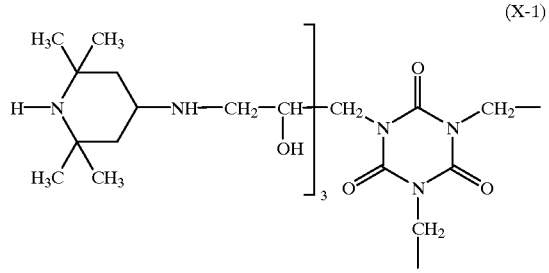
(X-1)

A preferred compound of the formula (XII) is:

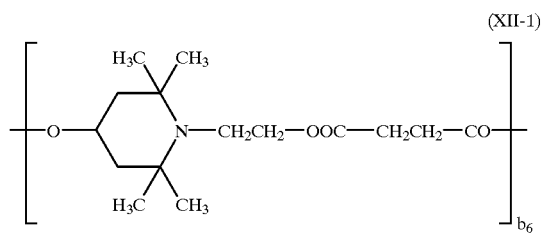
(XII-1)

with $b_6$ being a number from 2 to 20.

A preferred compound of the formula (XIII) is:

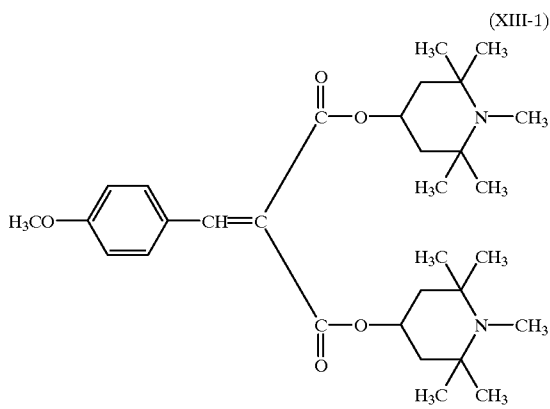
(XIII-1)

A preferred compound of the formula (XIV) is:

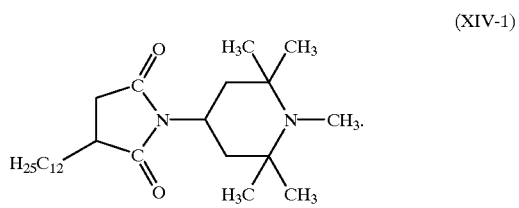
(XIV-1)

Preferred examples of a compound of the formula (XV) are:

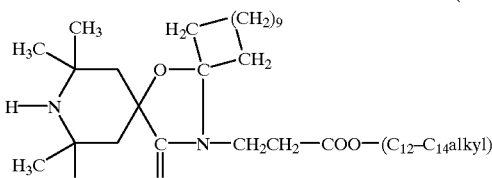
(XV-1)

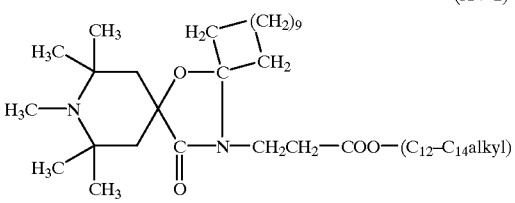
(XV-2)

The compounds of the formulae (Ia), (Ib), (II), (V), (VI), (VII), (IX), (X), (XII), (XIII), (XIV) and (XV) as well as the reaction product described under f) are known (in some cases commercially available) and can be prepared by known processes as described, for example, in U.S. Pat. Nos. 3,640,928, 4,108,829, 3,925,376, 4,086,204, 4,331, 586, 5,051,458, 4,529,760, 5,182,390, 4 233,412, GB-A-2 269 819, U.S. Pat. Nos. 4,356,307, 4,408,051 and 4,477,615 (Chemical Abstracts-CAS Nos. 136 504-96-6).

Preferred examples of a compound of the formula (Ia) are Tinuvin® 144, Tinuvin® 292, Tinuvin® 770, Mark® LA 52, Mark® LA 57 and n-butylmalonic acid bis[1,2,2,6,6-pentamethylpiperidin-4-yl] ester; preferred examples of a compound of the formula (Ib) are Mark® LA 62 and Mark® LA 67; a preferred example of a compound of the formula (II) is Chimassorb® 119; preferred examples of a compound of the formula (VI) are Chimassorb® 944, Cyasorb® UV 3346 and Dastib® 1082; preferred examples of a compound of the formula (VII) are Uvasil® 299 and Uvasil® 125; preferred examples of a compound of the formula (IX) are Mark® LA 63 and Mark® LA 68; a preferred example of a compound of the formula (XII) is Tinuvin® 622; a preferred example of a compound of the formula (XIII) is Sanduvor® PR-31; a preferred example of a compound of the formula (XIV) is Sanduvor® 3056; a preferred example of a compound of the formula (XV) is Sanduvor® 3050 and a preferred example of the reaction product described under f) is Uvasorb® HA88.

The reaction product described under f) can be prepared analogously to known processes, for example by reaction of a polyamine of the formula (VIII-a) with cyanuric chloride in a molar ratio of from 1:2 to 1:4 in the presence of anhydrous lithium carbonate, sodium carbonate or potassium carbonate in an organic solvent, such as 1,2-dichloroethane, toluene, xylene, benzene, dioxane or tert-amyl alcohol, at a temperature of from $-20°$ C. to $+10°$ C., preferably from $-10°$ C. to $+10°$ C., in particular from $0°$ C. to $+10°$ C., for from 2 to 8 hours, followed by reaction of the resultant product with a 2,2,6,6-tetramethyl-4-piperidylamine of the formula (VIII-b). The molar ratio between 2,2,6,6-tetramethyl-4-piperidylamine and polyamine of the formula (VIII-a) is, for example, from 4:1 to 8:1. The amount of 2,2,6,6-tetramethyl-4-piperidylamine can be added in one portion or in more than one portion at intervals of a few hours.

The polyamine of the formula (VIII-a):cyanuric chloride:2,2,6,6-tetramethyl-4-piperidylamine of the formula (VIII-b) ratio is preferably from 1:3:5 to 1:3:6.

The following example indicates one way of preparing a preferred compound of the reaction product described under f).

Example: 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added, and the resultant mixture is warmed at 60° C. for 2 hours. A further 18 g (0.13 mol) of anhydrous potassium carbonate are added, and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is refluxed for 2 hours and, for a further 12 hours, the water formed during the reaction is removed by azeotropic distillation. The mixture is filtered. The solution is washed with water and dried over $Na_2SO_4$. The solvent is evaporated, and the residue is dried at 120–130° C. in vacuo (0.1 mbar). The desired compound is obtained as a colourless resin.

In general, the reaction product described under f) can be represented for example by a compound of the formula VIII-1, VIII-2 or VIII-3. It can also be in the form of a mixture of these three compounds.

(VIII-1)

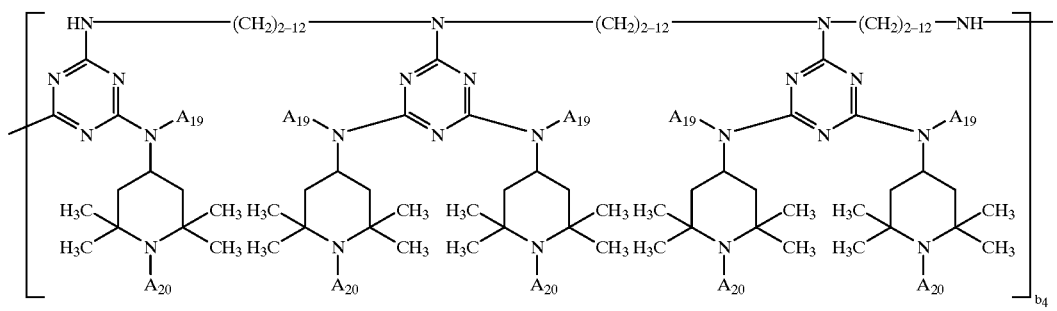

(VIII-2)

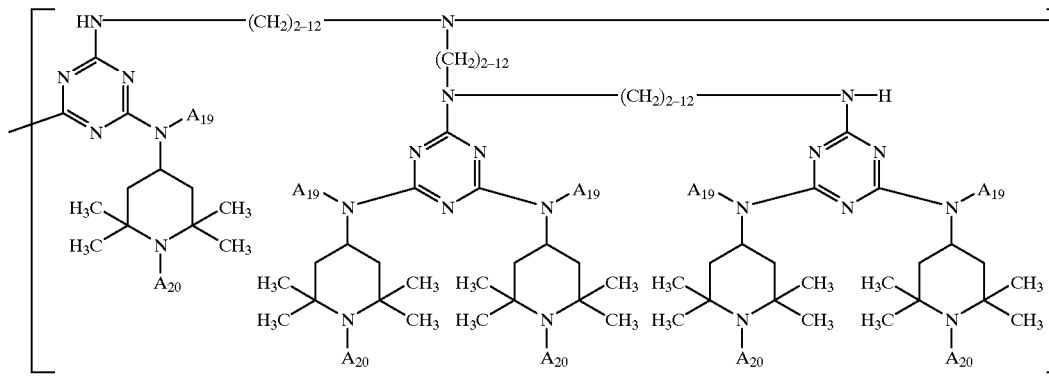

(VIII-3)

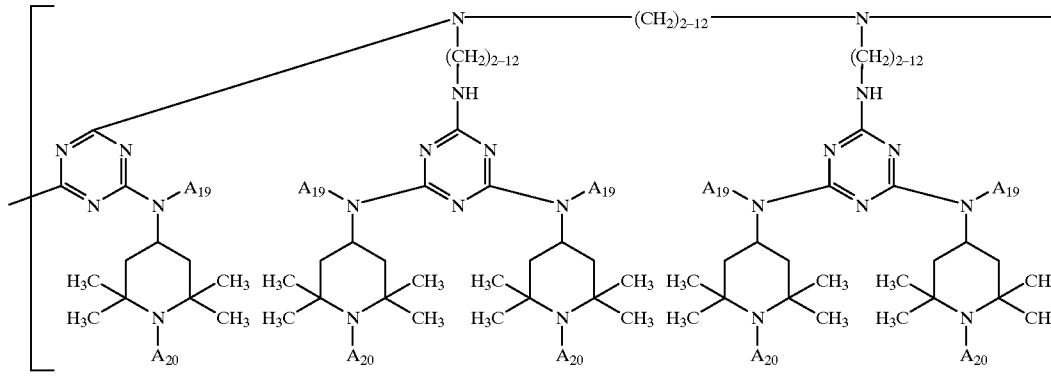

A preferred meaning of the formula (VIII-1) is

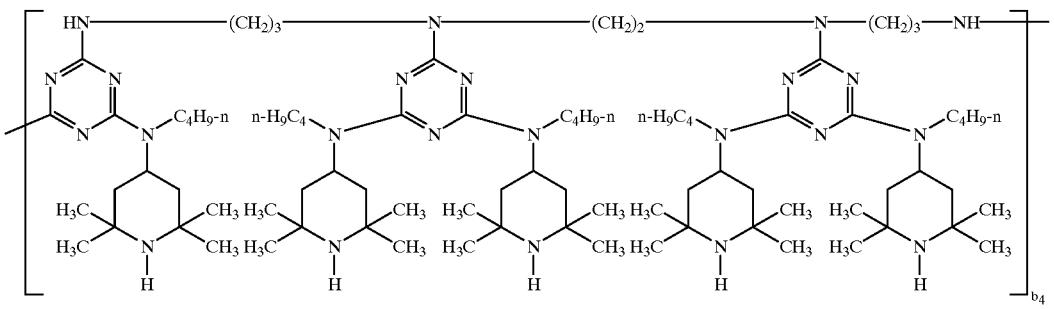

A preferred meaning of the formula (VIII-2) is

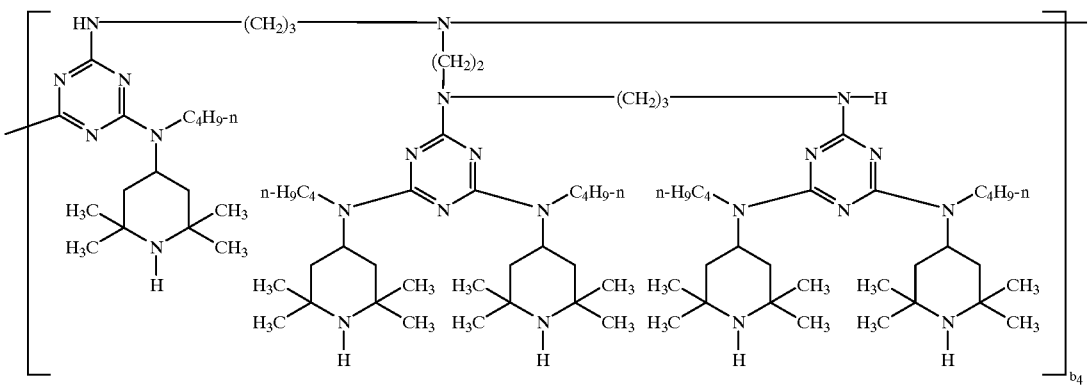

A preferred meaning of the formula (VIII-3) is

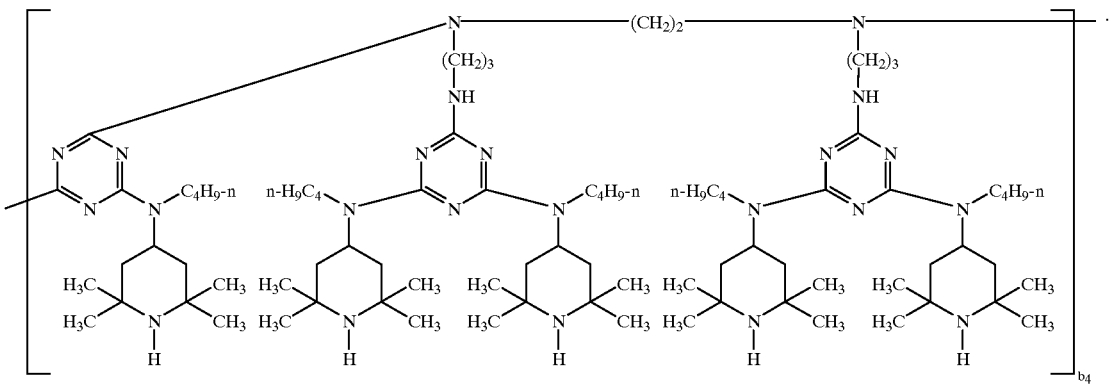

In the above formulae (VIII-1) to (VIII-3), $b_4$ is preferably 1 to 20.

The meanings of the terminal groups which saturate the free valences in the compounds of the formulae (VI), (VII), (VIII-1), (VIII-2) and (VIII-3), (IX) and (XII) depend on the processes used for their preparation. The terminal groups can also be modified after the preparation of the compounds.

In the compounds of the formula (VI), the end group bonded to the triazine residue can be, for example, chlorine or a group

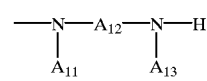

and the end group bonded to the diamino group can be, for example, hydrogen or a group

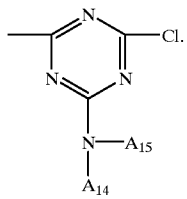

It may be convenient to replace the chlorine attached to the triazine by e.g. —OH or an amino group. Suitable amino groups are typically: pyrrolidin-1-yl, morpholino, —NH$_2$, —N(C$_1$–C$_8$alkyl)$_2$ and —NY'(C$_1$–C$_8$alkyl) wherein Y' is hydrogen or a group of the formula (IV).

In the compounds of the formula (VII), the terminal group bonded to the silicon atom can be, for example, (A$_{16}$)$_3$Si—O—, and the terminal group bonded to the oxygen atom can be, for example, —Si(A$_{16}$)$_3$.

The compounds of the formula (VII) can also be in the form of cyclic compounds if b$_3$ is a number from 3 to 10, i.e. the free valences shown in the structural formula then form a direct bond.

In the compounds of the formulae (VIII-1), (VIII-2) and (VIII-3), the terminal group bonded to the triazine radical is, for example, Cl or a

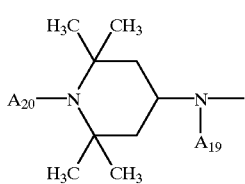

group, and the terminal group bonded to the amino radical is, for example, hydrogen or a

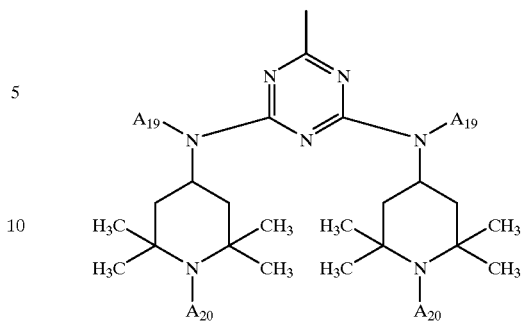

group.

In the compounds of the formula (IX), the end group bonded to the >C=O radical can be, for example, —OH, C$_1$–C$_4$alkoxy or

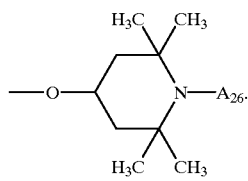

and the end group bonded to the oxygen atom can be, for example, hydrogen or

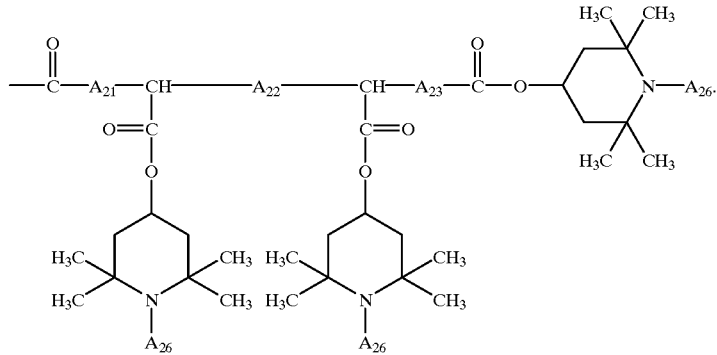

In the compounds of the formula (XII), the end group bonded to the —O— can be, for example, hydrogen or a group —CO—A$_{28}$—COO—Y" with Y" being hydrogen or C$_1$–C$_4$alkyl and the end group bonded to the diacyl radical can be, for example, —O—Y" or a group

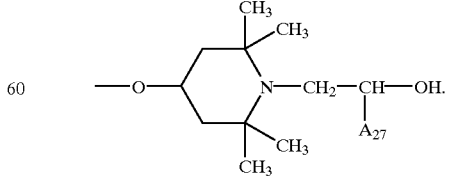

According to a preferred embodiment,

A$_1$ is hydrogen or C$_1$–C$_4$alkyl, $b_1$ is 2 or 4,
if $b_1$ is 2, $A_2$ is $C_2$–$C_8$alkylene or a group of the formula

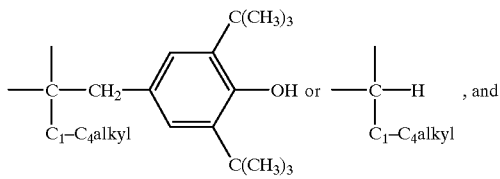

if $b_1$ is 4, $A_2$ is 1,2,3,4-butanetetrayl,
the radicals R independently of one another are —COO—$C_{13}H_{27}$ or a group

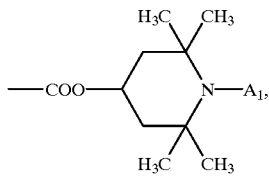

$A_3$ and $A_7$ independently of one another are hydrogen or $C_1$–$C_4$alkyl,
$A_4$, $A_5$ and $A_6$ independently of one another are $C_2$–$C_3$alkylene,
$T_1$, $T_2$, $T_3$, $T_4$, $T_5$, $T_6$, $T_7$ and $T_8$ independently of one another are a group of the formula (III) in which $A_8$ is hydrogen, $C_1$–$C_4$alkyl or a group of the formula (IV),
$A_{11}$, $A_{13}$, $A_{14}$ and $A_{15}$ independently of one another are hydrogen, $C_1$–$C_8$alkyl, cyclohexyl or a group of the formula (IV),
$A_{12}$ is $C_2$–$C_{10}$alkylene, or
$A_{14}$ and $A_{15}$, together with the nitrogen atom to which they are attached, form morpholino,
$b_2$ is a number from 2 to 25,
$A_{16}$ is $C_1$–$C_4$alkyl, cyclohexyl or phenyl,
$A_{17}$ is $C_3$–$C_8$alkylene,
$b_3$ is a number from 2 to 25,
$b_4'$, $b_4''$ and $b_4'''$ independently of one another are a number from 2 to 3,
$A_{19}$ is hydrogen or $C_1$–$C_4$alkyl,
$A_{21}$, $A_{23}$, $A_{24}$ and $A_{25}$ independently of one another are $C_1$–$C_4$alkylene,
$A_{22}$ is a direct bond, $b_5$ is a number from 1 to 20,
$A_{28}$ is $C_2$–$C_8$alkylene,
$b_6$ is a number from 2 to 25,
$A_{30}$ is $C_1$–$C_4$alkoxy,
$A_{31}$ is $C_{12}H_{25}$ and
$A_{34}$ is $C_{12}$–$C_{14}$alkyl.

According to a further preferred embodiment, one of the two different compounds containing a residue of the formula (A) is the compound of the formula (Ia-1), (Ia-2), (Ia-3), (Ia-4), (Ia-5), (II-1), (VI-1), (XII-1) or (XIII-1).

The two different compounds containing a residue of formula (A) are preferably selected from the group consisting of the compounds of the formulae (Ia-1), (Ia-2), (Ia-3), (Ia-4), (Ia-5), (Ia-6), (Ib-1), (Ib-2), (II-1), (VI-1), (VI-2), (VI-3), (VII-1), (VII1), (IX-1), (IX-2), (XII-1), (XIII-1) and (XIV-1), in particular (Ia-1), (Ia-2), (Ia-3), (Ia-6), (Ib-1), (II-1), (IX-2), (XII-1), (XIII-1) and (XIV-1) or from the group consisting of the compounds of the formulae (Ia-1), (Ia-2), (Ia-3), (Ia-4), (Ia-5), (II-1), (VI-1), (XII-1) and (XIII-1).

According to a particularly preferred embodiment of this invention the two different compounds containing a residue of the formula (A) are the compounds of the formulae (II-1) and (VI-1), the compounds of the formulae (II-1) and (XII-1), the compounds of the formulae (Ia-1) and (Ia-3), the compounds of the formulae (Ia-2) and (II-1) or the compounds of the formulae (Ia-3) and (II-1).

When the two different compounds containing a residue of the formula (A) are of resinous nature, it is preferred that their particle size is less than 2 mm and most preferably less than 1 mm. This ensures that the compounds are easily incorporated into the powder coating composition in a single extruder pass.

There are two main methods of charging powder paints in use at the present time: corona and triboelectric charging, both of which are well described in literature (T. A. Misev; "Powder Coatings: Chemistry and Technology", John Wiley & Sons, Chichester, 1991, pages 324–344). In the former technique, the powder is bombarded by ions on passage through a high electric field. The latter technique, which is of great importance, utilises the phenomenon of frictional charging. In triboelectric charging the powder is entrained in a jet of air and sprayed down a usually annular tube. The air flow rate should be sufficient to cause turbulent flow and thus ensure good contact between the powder and the tube. Electric charge separation occurrs between the surface of the powder particles and the wall of the charging tube. The charge in the tube leaks away to earth and the powder emerges from the charging tube highly charged.

There are a number of reasons why triboelectric charging is so widely used in the practice.

Firstly, the absence of a high voltage source is an obvious safety advantage, even though the design of corona coating guns has so far advanced as to virtually eliminate the dangers of a dust explosion.

Secondly, the corona guns emit a large quantity of free ions which, along with the charged powder, also drift towards the workpiece. As the thickness of the powder builds up on the workpiece a process known as back-ionisation starts to occur in which powder is rejected from the surface and subsequently causes unevenness and craters in the cured coating. In a corona-applied powder, the onset of back-ionisation is much earlier, due to the large number of free ions trapped in the coating.

A third reason is that, unlike in corona charging, there is no high electric field or Faraday cage effect in triboelectric charging, so that powders can more easily be applied to concave objects and into recessed areas.

For all these reasons it is important that powder paints be suitable for triboelectric application. Furthermore there is a practical aspect: a powder paint manufacturer often does not know what equipment a coater may use and certainly does not want to have a double range of powders, one suitable for corona and the other suitable for triboelectric application.

In powder coating it is important that, irrespective of whether the corona or triboelectric charging technique is used, the powder paint particles be highly charged. A high electrical charge on the powder ensures good efficiency of the coating process; ie. proportionally more powder ends up on the workpiece and less in the overspray to be recycled. Furthermore, too low a powder charge causes poor adhesion of the powder to the workpiece.

If the charge on the powder is very high, however, the powder particles will strongly repell one another and the packing of the powder on the workpiece will be loose. Also back-ionisation will occurr at an earlier stage as the coating thickness builds up. The net effect of both of these processes is a loss in the quality of the coating surface. In practice, there is therefore an optimum charge/mass ratio for triboelectric application, which depends upon factors such as the specific gravity of the powder, the surface regularity and the mean particle size etc.

The measurement of the efficiency of the triboelectric charging process is basically simple, although often misunderstood. Starting from the basic relationship between electrical current (I), charge (Q) and time (t):

$$I=Q/t$$

the following relationship can be derived, taking the mass of the powder (m) into account:

$$I=(Q/m)\times(m/t)$$

From this equation it can be seen that it is bad practice to take the triboelectric current as a measure of the efficiency of the triboelectric charging process, as this will be proportional to the powder flow rate (m/t), as long as conditions of turbulent flow are met and the limiting situation in which powder particles collide with each other instead of with the tube does not occur to any great extent. A better indicator of the efficiency of the charging process is therefore the charge/mass ratio (Q/m). This can be either calculated from the triboelectric current when the powder flow rate is known or measured directly. One such instrument for this purpose is described in the paper presented by Kleber and Lang at the 9 th Int. Conf. on Electrostatics, York, Apr. 2–5 1995 (Inst. Phys. Conf. Ser. No. 143, pages 201–204).

For the reasons outlined above, a preferred embodiment of this invention is a powder coating composition containing
1) an organic film-forming binder, and
2) at least two different compounds containing a residue of the formula (A)

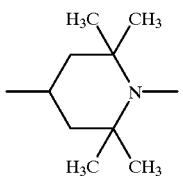

(A)

as electron donors,
characterized in that the powder coating composition has a charge/mass ratio of at least 200 μC/kg and preferably not exceeding 10000 μC/kg. Preferred ranges are 200–2000 μC/kg, 400–2000 μC/kg and 600–1000 μC/kg.

For a powder coating having a specific gravity of 1.3 g/cm³ to 3.0 g/cm³, a preferred embodiment of this invention is a powder coating composition having a charge/mass ratio of at least 200 μC/kg and not exceeding 5000 μC/kg, in particular 2000 μC/kg; more preferred is a charge/mass ratio in the range 400–2000 μC/kg, and even more preferred is the range 600–2000 μC/kg, e.g. 600–1500 μC/kg.

For a powder coating having a specific gravity of 0.8 g/cm³ to 1.3 g/cm³ a preferred embodiment of this invention is a powder coating composition having a charge/mass ratio of at least 400 μC/kg and not exceeding 10000 μC/kg, more preferred is a charge/mass ratio in the range 400–2000 μC/kg.

This invention also relates to a method for charging the powder coating composition as defined herein, which comprises charging the powder coating composition with a charge/mass ratio of at least 200 μC/kg in a tribo charging gun.

This invention also relates to a method for applying a powder coating composition as defined herein triboelectrically to a metal substrate.

Also a preferred embodiment of this invention is the use of a mixture comprising at least two different compounds containing a residue of the formula (A) as electron donors for a powder coating composition comprising an organic film-forming binder.

This invention further relates to a powder coating composition containing
1) an organic film-forming binder, and
2) at least two different compounds selected from the group consisting of the compounds of the formulae (Ia-4), (Ib-1), (Ib-2), (II-1), (VI-1), (VI-2), (VI-3), (VII-1), (VIII-1), (IX-1), (IX-2) and (XII-1) as defined above, in particular the compounds of the formulae (Ia-4), (Ib-1), (II-1), (IX-2) and (XII-1), for example (II-1) and (XII-1).

In the past, the triboelectric charging of powder paints was often insufficient or inconstant and it was found useful to assist the triboelectric charging of the powder by adding a positive corona to the end of the gun, which could be turned on or off or adjusted according to the need. Although the triboelectric charging afforded by the additives according to this invention (component (2)) is fully adequate to ensure a good tribochargeability, powders made as described herein can, of course, also be applied using this type of equipment.

A further development of triboelectric powder coating is described in WO-A-96/15 199 in which powder paint particles are frictionally charged by contact with magnetic or non-magnetic carrier particles and subsequently transferred to a substrate.

For such systems the powder coating compositions according to this invention are excellently suited. For the purpose of the workability of this invention it is sufficient that the charging occurs by friction and is not dependent on either the geometry or form of the contact partner. For example, triboelectric guns are also known in which the charging tube is coiled into a spiral or that end in a number of individually directable "fingers": also for these systems the mixtures of the compounds containing a residue of the formula (A) (=component (2)) work well.

The equipment used to charge the powder coating compositions of this invention can also be connected to a powder metering device, one example of which is described in EP-A-678 466.

Similarly, the workability of this invention is not restricted to any particular contact partner material in the charging process. Suitable contact partner materials include, for example, polyvinyl chloride, polyvinylfluoride, polyvinylidene chloride, polyvinylidene fluoride, polyethylene, polypropylene, fluorinated and non-fluorinated ethylene/propylene copolymers, polymethylmethacrylate and polystyrene and in particular polytetrafluoroethylene (PTFE).

The use of the mixture of the 2,2,6,6-tetramethylpiperidine derivatives (component (2)) is not restricted to any particular chemistry of powder coatings. The effect of the 2,2,6,6-tetramethylpiperidine derivative on the charge/mass ratio is approximately proportional to the amount of the derivative used, so that in principle any powder coating composition can be given tribochargeability by addition of an appropriate amount.

The definition of "powder coatings" is understood to be that as described in Ullmann's Encyclopedia of Industrial Chemistry, 5th, Completely Revised Edition, Vol. A 18, pages 438 to 444 (1991) in Section 3.4. Powder coatings are in particular thermoplastic or stovable, crosslinkable polymers which are applied in powder form to predominantly metallic substrates. The manner in which the powder is brought into contact with the workpiece to be coated is, according to this invention, preferably electrostatic powder spraying. The particles applied, which adhere by means of Coulomb forces on the workpiece, are melted together in an oven and cured. The stoving temperatures used are usually from 140° C. to 260° C., in particular from 140° C. to 220° C. and depend mainly on the chemistry of the powder coating formulations and the oven design. The oven residence times are typically in the range from several minutes to ½ hour.

In the case of UV-curable systems, after application to the substrate the powder coating composition according to this invention is first melted or heated, expediently using infrared radiation, to a temperature of 50° C. to 180° C. Subsequently, the coating is cured with UV light, preferably while still hot.

A further preferred embodiment of this invention is a cured powder coating made of a powder coating composition as described above.

Preferred substrates are metallic substrates such as, for example, those of iron, steel, copper, zinc, tin, magnesium, titanium or aluminium, and alloys thereof. Steel and aluminium and its alloys are of particular interest.

Preferred powder coating compositions are those in which the organic film-forming binder is a polyester or polyacrylate resin together with a crosslinking agent, or an epoxy resin, or combinations of these resins.

Polyesters are in general hydroxy-functional or carboxy-functional and are commonly prepared by condensation of diols and dicarboxylic acids. By adding polyols and/or polyacids, branched polyesters are obtained which then, on stoving in the presence of crosslinking agents, give rise to network structures which give the coating the desired physical properties, such as scratch resistance, impact resistance and flexural strength. In place of poly-functional acids it is also possible to use anhydrides or acid chlorides, for example maleic anhydride, itaconic anhydride, phthalic anhydride, terephthalic anhydride, hexahydroterephthalic anhydride, trimellitic anhydride, pyromellitic dianhydride, succinic anhydride, etc. It is also possible to use simple esters, for example dimethyl terephthalate, in which case polymerization takes place by transesterification with elimination of the volatile alcohol. Likewise practicable is preparation by combination of transesterification and condensation. Furthermore, polyesters can be prepared by polycondensation of hydroxycarboxylic acids, for example 12-hydroxystearic acid and hydroxypivalic acid, or of the corresponding lactones, for example ε-caprolactone. Examples of dicarboxylic acids and polyacids include terephthalic acid, isophthalic acid, adipic acid, azelaic acid, sebacic acid, 1,12-dodecanedioic acid, pyromellitic acid, 3,6-dichlorophthalic acid, succinic acid, 1,3-cyclohexanedicarboxylic acid and 1,4-cyclohexanedicarboxylic acid. Examples of diols and polyols include ethylene glycol, propylene glycol, glycerol, hexanetriol, hexane-2,5-diol, hexane-1,6-diol, pentaerythritol, sorbitol, neopentylglycol, trimethylolethane, trimethylolpropane, tris-1,4-cyclohexanedimethanol, trimethylpentanediol, 2,2-diethyl-1,3-propanediol, 2-methyl-2-butyl-1,3-propanediol, ester diol 204 (ester of hydroxypivalic acid and neopentylglycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol, 2-butyne-1,4-diol or 2-methyl-1,3-propanediol.

Suitable crosslinking agents for carboxy-functional polyesters are epoxy compounds, such as, for example, novolak-epoxy resins, diglycidyl ethers of bisphenol A, hydrogenated bisphenol A, and bisphenol A modified by reaction with, for example, aliphatic dicarboxylic acids. Also suitable are reactive epoxy compounds, such as triglycidyltriazolidine-3,5-dione, the glycidyl esters of polyacids, for example diglycidyl terephthalate and diglycidyl hexahydroterephthalate, hydantoin epoxides (U.S. Pat. No. 4,402,983) and, very particularly, triglycidyl isocyanurate, epoxidized unsaturated fatty acid esters of glycerol (Uranox®DSM) and Araldit® PT910 (®Ciba Specialty Chemicals). Other crosslinking agents for carboxy-functional polyesters are β-hydroxyalkylamides (U.S. Pat. No. 4,076,917), for example the predominantly tetrafunctional β-hydroxyalkylamide derivative of adipic acid (Primid® XL552 and QM1260 from ®EMS Chemie). Others which have proven suitable include derivatives of melamine, benzoguanimine and glycoluril, which are alkylated with low molecular weight alcohols. Examples are tetramethylmethoxyglycoluril (Powderlink® 1174 from ®American Cyanamid). Other known crosslinking agents are bis- and trisoxazolidines, for example 1,4-bisoxazolidinobenzene.

A recent development comprises carboxy-functional polyesters which contain chemically bonded epoxy groups and are consequently able to crosslink with themselves (Molhoek et al., 22nd Fatipec Congress, 15.–19.5.95, Budapest, Vol.1, 119–132).

In all systems in which an epoxy group or a glycidyl radical reacts with a carboxyl group or an anhydride in a crosslinking reaction, catalysts can be employed. Examples are amines or metal compounds, for example aluminium acetylacetonate or tin octoate.

As crosslinking agents for hydroxyfunctional polyesters, the polyisocyanate crosslinkers are of particular importance. In order to prevent premature crosslinking because of the high reactivity of isocyanates, and in order to obtain good levelling of the melted powder, the polyisocyanates are blocked (internally as an uretdione or as an adduct with a blocking agent). The most frequently employed blocking agents are ε-caprolactam, methyl ethyl ketoxime or butanoneoxime. Other suitable blocking agents for isocyanates are described in the publications of G. B. Guise, G. N. Freeland and G. C. Smith; J. Applied Polymer Science, 23, 353 (1979) and of M. Bock and H.-U. Maier-Westhues in "Progress in Product Development for Powder Coating Technology", XIX th Int. Conf. on Organic Coatings, Science and Technol., Athens, Jul., 12–16 1993. Examples of blocked or unblocked polyisocyanates include 2-methylpentane-1,5-diisocyanate, 2-ethylbutane-1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl)benzene, 4,4'-diisocyanatodicyclohexylmethane, 1,4-bis-(isocyanatomethyl)cyclohexane, m-tetramethylxylene diisocyanate, p-tetramethylxylene diisocyanate and, in particular, isophorone diisocyanate. For the reaction of the polyol with the polyisocyanate, a metallic catalyst, for example zinc octanoate, tin octanoate, dibutyltin oxide or dibutyltin dilaurate, is usually added to the polyisocyanate formulation.

Other crosslinking agents suitable for hydroxy-functional polyesters are anhydrides, for example trimellitic anhydride and its reaction products with diols and diamines. Further examples of such crosslinking agents are described by T. A. Misev in "Powder Coatings: Chemistry and Technology", John Wiley & Sons, Chichester, 1991, pages 123 and 124.

Preferred crosslinking agents for polyesters are an epoxy resin, triglycidylisocyanurate, glycoluril, hydroxyalkylamide, uretdione and blocked polyisocyanate.

Polyacrylates, which usually have hydroxy, carboxy or glycidyl functionality, are also employed as binders for powder coatings. They are prepared by the customary methods, predominantly from monomers such as styrene and linear or branched $C_1$–$C_8$alkyl esters of acrylic acid or methacrylic acid. Other ethylenically unsaturated compounds, for example divinylbenzene, acrylamide, methacrylamide, butoxymethylacrylamide, acrylonitrile, butadiene, etc., can also be added and copolymerized. Hydroxy functionality is provided by the copolymerization of hydroxy-functional monomers such as, for example, hydroxyethyl acrylate, hydroxyethyl methacrylate, hydroxypropyl acrylate and hydroxypropyl methacrylate. For carboxy functionality, ethylenically unsaturated acids and anhydrides, for example acrylic acid, methacrylic acid, itaconic acid, crotonic acid, maleic anhydride, itaconic anhydride, acrylic anhydride or methacrylic anhydride are used (U.S. Pat. No. 3,836,604). Glycidyl functionality is provided, as taught in EP-A-0 256 369 and U.S. Pat. No. 3,876,578, by the copolymerization of monomers such as glycidyl acrylate and glycidyl methacrylate.

As crosslinking agents for polyacrylates with hydroxy or carboxy functionality it is in principle possible to use the same compounds as already described for the polyesters with hydroxy or carboxy functionality. Further suitable crosslinking agents are the epoxy compounds of U.S. Pat. No. 0,045,040. Preferred crosslinking agents are an epoxy resin, triglycidylisocyanurate, glycoluril, hydroxyalkylamide, uretdione and blocked polyisocyanate.

Suitable crosslinking agents for polyacrylates with glycidyl functionality are dicarboxylic acids such as, for example, sebacic acid and 1,12-dodecanedioic acid, and anhydrides, for example bis-trimellitic anhydride and the compounds described in U.S. Pat. No. 3,880,946.

Also known, furthermore, are autocrosslinking polyacrylates, from DE-A-3 310 545.

It has been found that the mixture of the compounds containing a residue of the formula (A) (=component (2)) is particularly suitable for improving the triboelectric chargeability of polyacrylates.

Epoxy resins for powder coatings are mostly either novolak-epoxy resins or, in particular, those based on aromatic polyols, especially on bisphenols such as bisphenol A. Also known are modified bisphenol-epoxy resins from JP-A-58 187 464 (1982). The epoxy resins are employed in combination with crosslinking agents from the classes of the solid aliphatic amines, solid aromatic amines, amine adducts, phenolic resins, polyacids and the already described carboxyfunctional polyesters. Hardeners (curing agents) meriting special mention are the dicyandiamides, which are frequently employed together with a catalyst such as, for example, Lewis acids, boron trifluoride amine complexes, metal complexes, tertiary or quaternary amines, and imidazoline derivatives such as 2-methylimidazoline.

Powder coating compositions normally use an approximately stoichiometric ratio of resin to crosslinking agent. Variations from the stoichiometric ratio of more than 30% almost always result in a deterioration in the physical properties of the cured coating, such as flexibility, impact strength, adhesion, weatherability and solvent resistance etc.

Also of interest are film-forming binders with thermoplastic properties, examples being polyethylene, polypropylene, polyamides, polyvinyl chloride, polyvinylidene dichloride or polyvinylidene difluoride.

Furthermore, powder coatings are also known which comprise ethylenically unsaturated components and can be cured with photoinitiators.

Preference is given to powder coating compositions in which the organic film-forming binder (component (1)) is an ethylenically unsaturated component which can be cured in the presence of a photoinitiator with light, especially ultraviolet light. Examples of appropriate light sources are medium-pressure or high-pressure mercury lamps.

The powder coating compositions according to this invention can in addition comprise conventional additives such as pigments, dyes, fillers, flow aids, degassing agents, optical brighteners, adhesion promoters, photoinitiators, anticorrosion agents, antioxidants, UV absorbers, light stabilizers and so forth.

The pigments are for example titanium dioxide, iron oxide, carbon black, aluminium bronze or phthalocyanine blue.

Examples of dyes are polyester dyes and solvent dyes.

Examples of fillers are talc, alumina, aluminium silicate, barytes, lithopone, calcium carbonate, mica or silica.

Examples of flow aids are epoxidized fatty acids, abietyl alcohol, polylauryl methacrylate, polylauryl acrylate, polydimethylsiloxane-polyalkylene oxide block copolymers or, in particular, low molecular weight copolymers and polymers of $C_1$–$C_8$alkyl acrylate esters or alkyl methacrylate esters.

Examples of degassing agents are fatty acid amides as described in EP-A-0 471 409, ε-caprolactam, methyl isophthalate and dimethyl isophthalate (EP-A-0 284 996), and especially benzoin.

An example of a particularly suitable optical brightener is Uvitex®OB (®Ciba Specialty Chemicals).

Adhesion promoters are based, for example, on modified silanes, titanates or zirconates.

Suitable photoinitiators are those based on benzophenones, phenyl glyoxalates, bis- or mono-acylphosphine oxides, α-hydroxy ketones or benzyl dimethyl ketals and especially combinations thereof.

Examples of anticorrosion agents are anticorrosion pigments, such as phosphate- or borate-containing pigments or metal oxide pigments, or other organic or inorganic corrosion inhibitors, for example salts of nitroisophthalic acid, phosphoric esters, technical-grade amines or substituted benzotriazoles.

Examples of antioxidants are:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tertbutylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

4. Tocopherols, for example α-tocopherol, β-tocopherol, γ-tocopherol, δ-tocopherol and mixtures thereof (Vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.

6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy2-methylphenyl)pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5di-tert-butyl-4-hydroxybenzylmercaptoacetate.

8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β-(3.5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(5-tert-butyl-4-hydroxy-3-methylphenyl) pro[ionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

Examples of UV absorbers and other conventional additives are:

I. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tertbutyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol300; where R=3'-tert-butyl-4'-hydroxy-5'-2H-benzotriazol-2-ylphenyl.

II. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

III. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

IV. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

V. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

VI. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

VII. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

VIII. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

IX. Thiosynergists, for example, dilauryl thiodipropionate or distearyl thiodipropionate.

X. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

The two different compounds containing a residue of the formula (A), together, are generally present in a quantity of from 0.1 to 10%, preferably 0.2 to 5%, in particular 0.5 to 3%, by weight of the total solids of the powder coating composition.

The weight ratio of these two compounds is for example 95:5 to 5:95, 90:10 to 10:90, 80:20 to 20:80, 70:30 to 30:70, 60:40 to 40:60 or 50:50.

According to a preferred embodiment of this invention, the powder coating compositions additionally contain a phosphite or a phosphonite, for example in an amount of from 0.01 to 10%, preferably 0.02 to 5%, in particular 0.05 to 3%, by weight relative to the total solids of the powder composition.

Examples of phosphites and phosphonites are triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methylphosphite or bis(2,4-di-tert-butyl-6-methylphenyl) ethylphosphite.

The preparation of the powder coating compositions according to this invention can be carried out in accordance with customary methods. A good description of the procedures and machinery can be found in T. A. Misev in "Powder Coatings: Chemistry and Technology", John Wiley & Sons, Chichester, 1991, Chapter 5.

In general, all of the components of the powder coating composition are weighed out and mixed together in an appropriate mixer. Mixers used for this purpose are tumble mixers, cone mixers, double-cone mixers, horizontal mixers, blenders and stirring units such as planetary mixers.

Normally, the formulation is processed in a heated extruder at temperatures, which are typically in the range 70–120° C., preferably 70–110° C., to obtain a melted mass of maximum homogeneity. Apparatus suitable for this includes single-screw cokneader, twin-screw extruders and planetary extruders. Addition is made in most cases by way of a screw conveyor, a conveyor belt or a shaking trough. Following extrusion the hot mass is rolled out and cooled, for example on a cooling belt. When it has solidified, the mass is crushed and then ground. Suitable grinding units are pinned-disc mills, ultracentrifugal mills, jet mills and, especially, classifying mills. The powder may be subsequently classified and is preferably sieved. If desired, additional substances can be blended into the powder before sieving, for example anticaking agents such as silica or metal flake pigments.

The powder coating compositions of this invention have preferably a mean particle size of 5 $\mu$m to 100 $\mu$m, and more preferably 30 $\mu$m to 50 $\mu$m.

Other techniques for the preparation of powder coatings (EP-B-368 851 or WO-A-92/00342) have recently been disclosed which can also be employed for this invention. In these techniques the premixed formulation or extrudate is fed to a heated rotary tube and is spun out centrifugally on a rotating plate. At the edge of the plate, round, virtually monodisperse droplets are formed which solidify in cooled air before falling into a hopper.

A recent technique of preparing powder coating powders is described in EP-A-661 091 and WO-A-94/009 913. Here all the components of the powder coating formulation are mixed together in the presence of a super-critical liquid which is preferably carbon dioxide. The mixture is sprayed out of fine jets in such a way as to give rounded particles of powder paint of the required size when the carbon dioxide is flashed off.

In cases where component (2) of the powder coating compositions according to this invention is either a very low melting point solid (<50° C.) or liquid, problems may arise in handling, as sticky or liquid products cannot be easily mixed together and fed into an extruder. Difficulties may also arise when component (2) is a solid with a high melting point (>120° C.) or high melt viscosity at extrusion temperatures, as such products often do not homogenise completely in the resin on extrusion. In such cases it has been found useful to use component (2) of this invention in the form of a masterbatch.

A masterbatch is essentially a concentrate of component (2) dispersed or preferably dissolved in one of the resins forming component (1), such as polyester, epoxy resin or polyacrylate. The amount of additives that the masterbatch may contain is limited only by considerations of solubility and the physical properties of the masterbatch, such as the tendency to cake on storage. Values may vary from 5–90%, preferably 5–60%, more preferably 5–40% and most preferably 5–30% of the component (2) in a masterbatch.

For all types of resins a masterbatch can be made at some stage during the resin synthesis. For example, in the case of polyesters, which are usually prepared at temperatures of ca. 240° C., component (2) can be conveniently and preferably dissolved up in the hot resin after synthesis during the cool-down cycle. If an extruder is used to make the masterbatch then, of course, the other reactive component of the powder coating is omitted and a higher melt temperature can be used if desired. Other components of powder coatings, such as flow aids, degassing agents etc. can be incorporated into the masterbatch of component (2) if convenient.

A further preferred embodiment of this invention is a masterbatch comprising a polyester, an epoxy resin or a polyacrylate and at least two different compounds containing a residue of the formula (A).

An alternative method of using component (2) of the powder coatings according to this invention is in a form absorbed onto a porous solid. This is particularly useful if component (2) happens to be a liquid or resinous solid at room temperature. The amount of component (2) that can be absorbed onto the absorbent is limited only by the need for the final product to be in the form of a free-flowing powder, as such a powder can be easily mixed together with the other components of the powder coating formulation prior to extrusion. For this use an absorbent is generally chosen that has a high oil absorbance value, together with a low particle size to reduce matting; suitable absorbents are alumina and particularly silica.

The examples which follow illustrate the invention in more detail. Parts and percentages are by weight, unless stated otherwise.

2,2,6,6-Tetramethylpiperidine derivatives (hindered amines) used in EXAMPLES 1 to 6

Compound (Ia-1):
(Tinuvin®144)

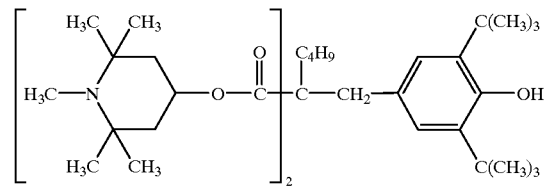

Compound (Ia-2):
(Tinuvin®292)

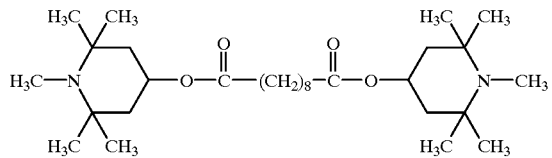

Compound (Ia-3):
(Tinuvin®770)

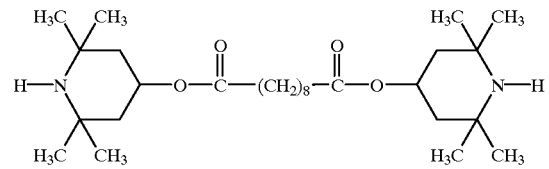

Compound (Ia-6):
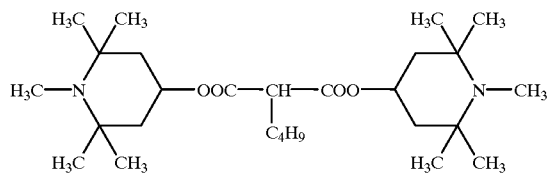
Compound (Ib-1):
(Mark®LA62)
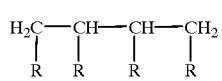
in which the radicals R are —COO—$C_{13}H_{27}$ and
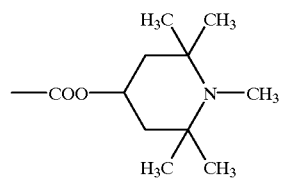
in a ratio of 1.7:2.3.
Compound (II-1):
(Chimassorb®119 FL (milled to 100–250 μm))
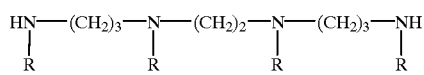
with R being the group
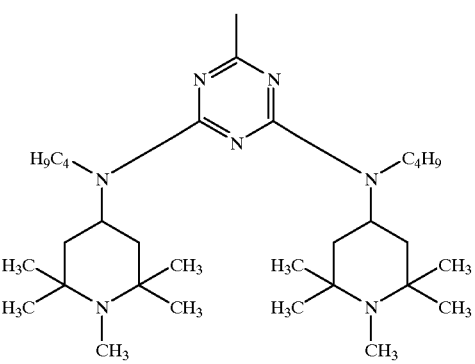
Compound (IX-2):
(Mark®LA63)
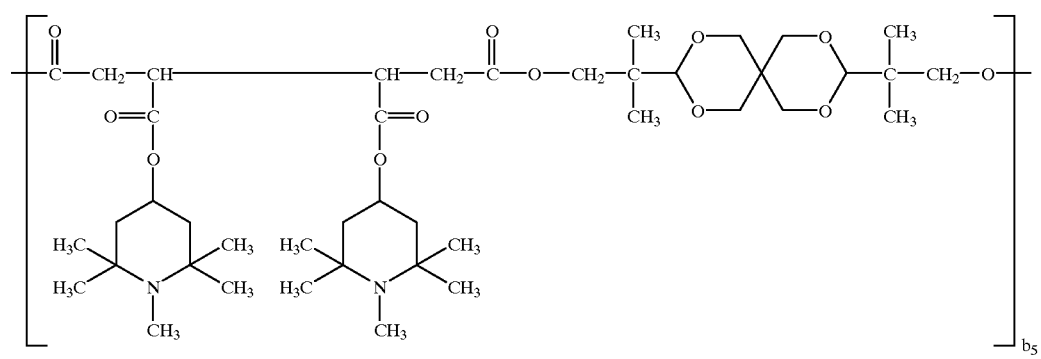
with $b_5$ being a number from 1 to 20,
Compound (XII-1):
(Tinuvin®622 LD)
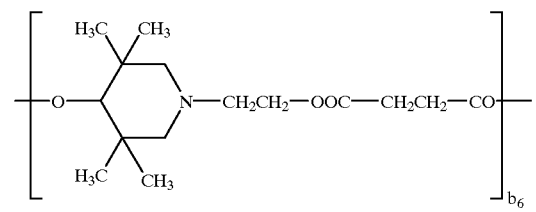
with $b_6$ being a number from 2 to 25, Compound (XIII-1):
(Sanduvor®PR31)

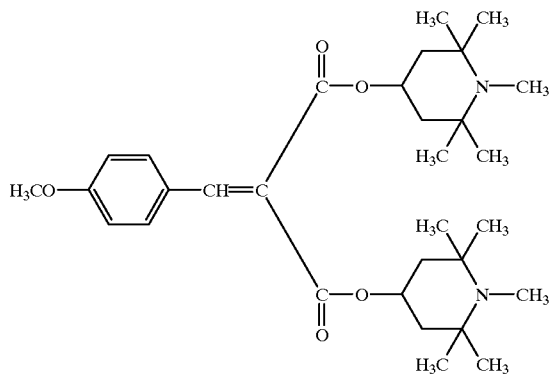

Compound (XIV-1):
(Sanduvor®3056)

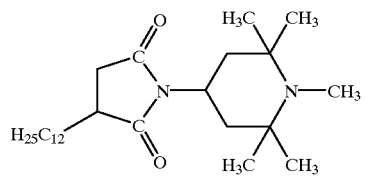

EXAMPLE 1

The formulations listed in Table 1 are extruded once at 110° C. and 300 rpm using a Prism extruder fitted with a standard screw.

TABLE 1

| Formulation: | Quantities in g. | | | |
|---|---|---|---|---|
| | 1 | 2 | 3 | 4 |
| Crylcoat ® 430 (® UCB S.A.) Carboxy-functionalised polyester | 366.4 | 366.4 | 366.4 | 366.4 |
| Araldit ® PT 810 (® Ciba Specialty Chemicals Inc.) Triglycidylisocyanurate | 27.6 | 27.6 | 27.6 | 27.6 |
| Resiflow ® PV 88 (® Worlée Chemie GmbH) Flow aid | 4.0 | 4.0 | 4.0 | 4.0 |
| TiO₂ ® Kronos 2160 (® Kronos-Titan GmbH) | 200 | 200 | 200 | 200 |
| Benzoin Degassing agent | 2 | 2 | 2 | 2 |
| Compound (II-1) | | | 12 | 6 |
| Compound (XII-1) | | 12 | | 6 |
| Total: | 600 | 612 | 612 | 612 |

The melt is rolled out and coarsely milled using a table cutter. The formulations are then finely milled using a ®Retsch ZM-1 ultracentrifugal mill at 15,000 rpm using a 0.25 mm milling sieve. The resultant powder is sieved through a 125 μm sieve to give a powder coating of average particle size 32 μm. The triboelectric charging is determined using an apparatus for triboelectric charge measurement developed by and obtainable from Professors H. Bauch and W. Kleber of Dresden, Germany. The instrument, which is fully described in literature (paper presented by Kleber and Lang at the 9th Int. Conf. on Electrostatics, York, Apr. 2–5 1995 (Inst. Phys. Conf. Ser. No. 143, pages 201–204.), uses a PTFE charging tube of internal diameter 12 mm, with a 250 mm PTFE rod of diameter 10 mm fitted inside. In addition to the standard air pressure gauge, the apparatus is fitted with a flowmeter to enable the air flow rate through the PTFE tube to be accurately monitored. Dry, oil-free compressed air at 22° C. is used for all triboelectric charging measurements at an air flow rate 1800 L/h. Using a sample size of 60 g, measurements of the total charge (in μC) generated and the time of flow of the powder through the charge tube are made. From these values the charge/mass ratio (in μC/kg) is calculated for each sample. The flow rates of the powders are all in the range 160–200 g/min.

TABLE 2

| Formulation no. | Hindered amine | charge/mass ratio (μC/Kg) |
|---|---|---|
| 1 | none | 170 |
| 2 | Compound (II-1) | 1580 |
| 3 | Compound (XII-1) | 1080 |
| 4 | 1:1 Mixture of compounds (II-1) and (XII-1) | 1770 |

The results shown in Table 2 clearly reveal a synergistic effect for the mixture of compounds (II-1) and (XII-1) in comparison with the single compounds at the same total concentration of hindered amine.

EXAMPLE 2

Instead of the compound (XII-1) in Example 1, the compound (Ia-3) is used to give the formulations 5 and 6. The powders are prepared and measured in exactly the same manner as described in Example 1. The results obtained are shown in Table 3.

TABLE 3

| Formulation no. | Hindered amine | charge/mass ratio (μC/Kg) |
|---|---|---|
| 1 | none | 170 |
| 5 | Compound (I-3) | 860 |
| 3 | Compound (II-1) | 1580 |
| 6 | 1:1 Mixture of compounds (I-3) and (II-1) | 1720 |

The results shown in Table 3 again reveal a synergistic effect for the mixture of compounds (I-3) and (II-1) in comparison with the single compounds at the same total concentration of hindered amine.

EXAMPLE 3

The general formulation shown in Table 4 is used for the preparation of powder coatings which are based on a glycidyl-methacrylate-functionalised polyacrylate (GMA-resin):

TABLE 4

| Component | Quantities in g. |
|---|---|
| Almatex ® PD 7690 (® Mitsui Chemicals Europe GmbH) GMA-resin | 157.4 |
| 1,12-Dodecanoic acid (® Du Pont de Nemours Inc.) crosslinking agent | 38.6 |
| Resiflow ® PV88 | 3 |

TABLE 4-continued

| Component | Quantities in g. |
|---|---|
| (® Worlee Chemie GmbH) | |
| Flow aid | |
| Benzoin | 1 |
| Degassing agent | |
| $TiO_2$, ® Bayer R-KB-5 | 100 |
| Hindered amine from Table 5 | 1.5 |

TABLE 5

| Formulation no. | Hindered amine(s) |
|---|---|
| 1 | none |
| 2 | Compound (Ib-1) |
| 3 | Compound (IX-2) |
| 4 | Compound (VIII-1) |
| 5 | Compound (XIV-1) |
| 6 | Compound (Ia-6) |
| 7 | Compound (Ia-2) |
| 8 | Compound (Ia-1) |
| 9 | 1:1 Mixture of compounds (Ib-1) and (Ia-1) |
| 10 | 1:1 Mixture of compounds (IX-2) and (Ia-1) |
| 11 | 1:1 Mixture of compounds (IX-2) and (Ia-6) |
| 12 | 1:1 Mixture of compounds (XIII-1) and (Ia-1) |
| 13 | 1:1 Mixture of compounds (XIII-1) and (Ia-6) |
| 14 | 1:1 Mixture of compounds (XIV-1) and (Ia-6) |
| 15 | 1:1 Mixture of compounds (Ia-2) and (Ia-6) |
| 16 | 1:1 Mixture of compounds (Ia-1) and (Ia-6) |
| 17 | 1:1 Mixture of compounds (IX-2) and (XIII-1) |

The formulations are mixed together well and then extruded in two passes at 90° C. using a Prism extruder. The extruded formulations are passed through cooling rollers, left to cool, crushed with a rolling pin in a polyethylene bag and then milled at 10.000 rpm using a Retsch® ZM-1 ultracentrifugal mill fitted with a collector ring and a 1.5 mm milling sieve. The powder is finally sieved on a gyratory sieve through a 125 μm sieve. The particle size of the powders is ca. 31 μm.

In the case of the formulations 8, 9, 10, 12 and 16, the compound (Ia-1) is used in the form masterbatch. This is prepared by blending 19 parts of the Almatex® resin with 1 part of the compound (Ia-1) and compounding at 145° C. in the Prism extruder. The quantity of Almatex® resin in these formulations is then adjusted accordingly, to ensure the same binder/crosslinker ratio, and the complete formulation with the other components extruded again in the normal way.

The charging properties of the powders is measured in the manner previously described in Example 1. The results are shown in Table 6.

TABLE 6

| Formulation no. | Hindered amine(s) | Charge/mass ratio (μC/Kg) |
|---|---|---|
| 1 | none | 472 |
| 2 | Compound (Ib-1) | 722 |
| 3 | Compound (IX-2) | 717 |
| 4 | Compound (VIII-1) | 689 |
| 5 | Compound (XIV-1) | 733 |
| 6 | Compound (Ia-6) | 750 |
| 7 | Compound (Ia-2) | 783 |
| 8 | Compound (Ia-1) | 694 |
| 9 | 1:1 Mixture of compounds (Ib-1) and (Ia-1) | 733 |
| 10 | 1:1 Mixture of compounds (IX-2) and (Ia-1) | 733 |
| 11 | 1:1 Mixture of compounds (IX-2) and (Ia-6) | 767 |
| 12 | 1:1 Mixture of compounds (XIII-1) and (Ia-1) | 711 |
| 13 | 1:1 Mixture of compounds (XIII-1) and (Ia-6) | 756 |
| 14 | 1:1 Mixture of compounds (XIV-1) and (Ia-6) | 756 |
| 15 | 1:1 Mixture of compounds (Ia-2) and (Ia-6) | 800 |
| 16 | 1:1 Mixture of compounds (Ia-1) and (Ia-6) | 772 |
| 17 | 1:1 Mixture of compounds (IX-2) and (XIII-1) | 739 |

The results shown in Table 6 clearly reveal a synergistic effect for the mixture in comparison with the single compounds at the same total concentration of hindered amine.

EXAMPLE 4

A preferred mixture of two hindered amines is a 50:50 mixture of the compounds (II-1) and (XII-1) that has been melted together. This is sold commercially by ®Ciba Speciality Chemicals as Tinuvin® 111. The particular product form used in this example is Tinuvin® 111 FD, which is in the form of dust-free pellets of size ca. 2 mm. Powder coatings prepared using this blend of hindered amines, according to formulation described in Table 7, show that excellent triboelectric chargeability can be imparted to systems that are crosslinked with isocyanate chemistry.

TABLE 7

| | Quantities in g. | | |
|---|---|---|---|
| Formulation: | 1 | 2 | 3 |
| Crylcoat ® 240 | 869.4 | 869.4 | 869.4 |
| (® UCB S.A., Drogenbos, Belgium) | | | |
| Hydroxy-functionalised polyester | | | |
| Vestagon ® BF 1540 | 118.6 | 118.6 | 118.6 |
| (® Hüls AG, Marl, Germany) | | | |
| Uretdione crosslinking agent | | | |
| Resiflow ® PV88 | 10 | 10 | 10 |
| (® Worlée Chemie GmbH, Lauenburg, Germany) | | | |
| Flow-aid | | | |
| Benzoin | 2 | 2 | 2 |
| (® Fluka AG, Buchs, Switzerland) | | | |
| ® Bayer Titan R-KB-5 | 500 | 500 | 500 |
| (® Bayer AG, Leverkusen, Germany) | | | |
| Tinuvin® 111 FD | 0 | 5 | 10 |
| (® Ciba Speciality Chemicals, Basel, Switzerland) | | | |
| Total | 1500 | 1505 | 1510 |

The formulations are mixed together well and then extruded in two passes at 80° C. using a Buss® PLK 46L extruder at 125 rpm. The extruded formulations are then milled on a Retsch® ZM-1 ultracentrifugal mill and sieved. The mean particle size is ca. 44 μm.

The triboelectric charging properties of the powders is measured in the manner previously described in Example 1. The results are shown in Table 8.

TABLE 8

| Formulation no. | Concentration of Tinuvin ® 111 FD on total resins (%) | Charge/mass ratio (μC/Kg) |
|---|---|---|
| 1 | 0 | 467 |
| 2 | 0.5 | 1039 |
| 3 | 1.0 | 1100 |

EXAMPLE 5

In similar manner to Example 4, it can be shown that the blend of hindered amines commercially sold as Tinuvin®

111 FD is well suited to improve the triboelectric chargeability of a polyester/epoxy hybrid powder paint. For this purpose the formulations described in Table 9 are made up.

TABLE 9

| Formulation: | Quantities in g. | | | | |
|---|---|---|---|---|---|
| | 1 | 2 | 3 | 4 | 5 |
| Crylcoat ® 360 (® UCB S.A., Drogenbos, Belgium) Carboxy-functionalised polyester | 577.8 | 577.8 | 577.8 | 577.8 | 577.8 |
| Araldit ® GT 7004 (® Ciba Speciality Chemicals, Basel, Switzerland) Epoxy resin | 385.2 | 385.2 | 385.2 | 385.2 | 385.2 |
| Araldit ® DT 3126 (® Ciba Speciality Chemicals, Basel, Switzerland) Catalyst masterbatch | 25 | 25 | 25 | 25 | 25 |
| Resiflow ® PV88 (® Worlée Chemie GmbH, Lauenburg, Germany) Flow-aid | 10 | 10 | 10 | 10 | 10 |
| Benzoin (® Fluka AG, Buchs, Switzerland) | 2 | 2 | 2 | 2 | 2 |
| Bayer ® Titan R-KB-5 (® Bayer AG, Leverkusen, Germany) | 500 | 500 | 500 | 500 | 500 |
| Tinuvin ® 111 FD | 0 | 5 | 10 | 15 | 20 |
| (® Ciba Speciality Chemicals, Basel, Switzerland) | | | | | |
| Total | 1500 | 1505 | 1510 | 1515 | 1520 |

The formulations are mixed together well and then extruded in two passes at 80° C. using a Buss® PLK 46L extruder at 125 rpm. The extruded formulations are then milled on a Retsch® ZM1 ultracentifugal mill and sieved. The mean particle size is ca. 43 μm.

The triboelectric charging properties of the powders is measured in the manner previously described in Example 1. The results are shown in Table 10.

TABLE 10

| Formulation no. | Concentration of Tinuvin ® 111 FD on total resins (%) | Charge/mass ratio (μC/Kg) |
|---|---|---|
| 1 | 0 | 172 |
| 2 | 0.5 | 794 |
| 3 | 1.0 | 978 |
| 4 | 1.5 | 1039 |
| 5 | 2.0 | 1133 |

EXAMPLE 6

It can further be shown that the blend of hindered amines commercially sold as Tinuvin® 111 FD is well suited to improve the triboelectric chargeability of a polyester/Araldit® PT 910 powder paint. For this purpose the formulations described in Table 11 are made up.

TABLE 11

| Formulation: | Quantities in g. | | | | |
|---|---|---|---|---|---|
| | 1 | 2 | 3 | 4 | 5 |
| Crylcoat ® 803 (® UCB S.A., Drogenbos, | 918 | 918 | 918 | 918 | 918 |

TABLE 11-continued

| Formulation: | Quantities in g. | | | | |
|---|---|---|---|---|---|
| | 1 | 2 | 3 | 4 | 5 |
| Belgium) Carboxy-functionalised polyester | | | | | |
| Araldit ® PT 910 (® Ciba Speciality Chemicals, Basel, Switzerland) Epoxy crosslinking agent | 69 | 69 | 69 | 69 | 69 |
| Resiflow ® PV88 (® Worlée Chemie GmbH, Lauenburg, Germany) Flow-aid | 10 | 10 | 10 | 10 | 10 |
| Benzoin (® Fluka AG, Buchs, Switzerland) | 3 | 3 | 3 | 3 | 3 |
| ® Bayer Titan R-KB-5 (® Bayer AG, Leverkusen, Germany) | 500 | 500 | 500 | 500 | 500 |
| Tinuvin ® 111 FD | 0 | 5 | 10 | 15 | 20 |
| (® Ciba Speciality Chemicals, Basel, Switzerland) | | | | | |
| Total | 1500 | 1505 | 1510 | 1515 | 1520 |

The formulations are mixed together well and then extruded in two passes at 80° C. using a Buss® (PLK 46L extruder at 125 rpm. The extruded formulations are then milled on a Retsch® ZM-1 ultracentifugal mill and sieved. The mean particle size is ca. 51 μm.

The triboelectric charging properties of the powders is measured in the manner previously described in Example 1. The results are shown in Table 12.

TABLE 12

| Formulation no. | Concentration of Tinuvin ® 111 FD on total resins (%) | Charge/mass ratio (μC/Kg) |
|---|---|---|
| 1 | 0 | 217 |
| 2 | 0.5 | 767 |
| 3 | 1.0 | 953 |
| 4 | 1.5 | 1045 |
| 5 | 2.0 | 1067 |

What is claimed is:

1. A method for applying a powder coating composition containing 1) an organic film-forming binder, and 2) at least two different compounds containing a residue of the formula (A)

(A)

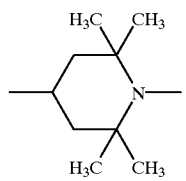

as electron donors,
triboelectrically to a metal substrate.

2. A method according to claim 1 wherein the two different compounds containing a residue of the formula (A) are selected from the group consisting of the classes a) a compound of the formula (Ia) or (Ib)

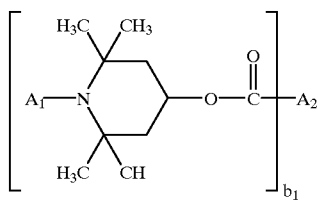
(Ia)

in which $A_1$ is hydrogen, $C_1$–$C_8$alkyl or $C_3$–$C_6$alkenyl, $b_1$ is 1, 2 or 4, if $b_1$ is 1, $A_2$ is $C_1$–$C_9$alkyl, if $b_1$ is 2, $A_2$ is $C_1$–$C_{10}$alkylene or a group of the formula or

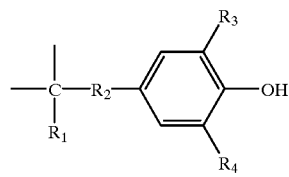

wherein $R_1$ is $C_1$–$C_{10}$alkyl or $C_2$–$C_{10}$alkenyl, $R_2$ is $C_1$–$C_{10}$alkylene and $R_3$ and $R_4$ are independently of one another $C_1$–$C_4$alkyl, cyclohexyl or methylcyclohexyl, and if $b_1$ is 4, $A_2$ is $C_4$–$C_{10}$alkanetetrayl;

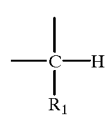

(Ib)

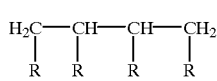

in which the radicals R independently of one another are —COO—($C_1$–$C_{20}$alkyl) or a group

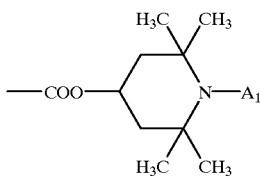

with $A_1$ being as defined above;

b) a compound of the formula (II)

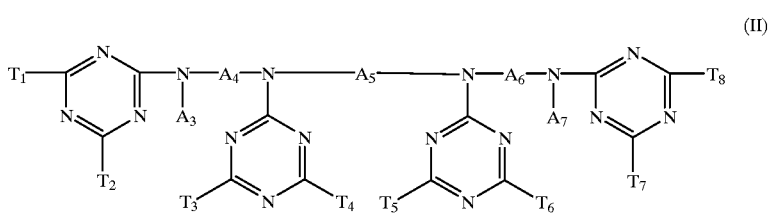
(II)

in which $A_3$ and $A_7$ independently of one another are hydrogen or $C_1$–$C_{12}$alkyl, $A_4$, $A_5$ and $A_6$ independently of one another are $C_2$–$C_{10}$alkylene and $T_1$, $T_2$, $T_3$, $T_4$, $T_5$, $T_6$, $T_7$ and $T_8$ independently of one another are a group of the formula (III)

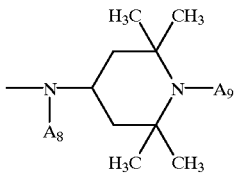
(III)

in which $A_8$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl or a group of the formula (IV)

(IV)

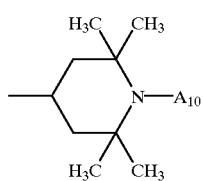

and $A_9$ and $A_{10}$ independently of one another are as defined for $A_1$;

c) a compound of the formula (V)

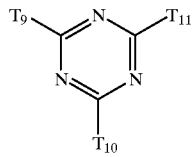

(V)

in which
$T_9$, $T_{10}$ and $T_{11}$ independently of one another are a group of the formula (III);

d) a compound of the formula (VI)

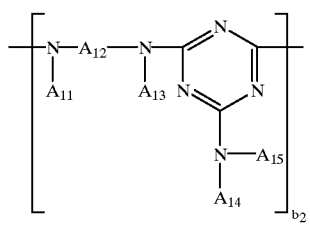

(VI)

in which
$A_{11}$, $A_{13}$, $A_{14}$ and $A_{15}$ independently of one another are hydrogen, $C_1$–$C_{12}$alkyl, $C_5$–$C_{12}$cycloalkyl, $C_1$–$C_4$alkyl-substituted $C_5$–$C_{12}$cycloalkyl, phenyl or a group of the formula (IV),
$A_{12}$ is $C_2$–$C_{10}$alkylene, $C_5$–$C_7$cycloalkylene or $C_1$–$C_4$alkylenedi($C_5$–$C_7$cycloalkylene), or
the radicals $A_{11}$, $A_{12}$ and $A_{13}$, together with the nitrogen atoms to which they are attached, form a 5- to 10-membered heterocyclic ring, or
$A_{14}$ and $A_{15}$, together with the nitrogen atom to which they are attached, form a 5- to 10-membered heterocyclic ring,
$b_2$ is a number from 2 to 50 and
at least one of the radicals $A_{11}$, $A_{13}$, $A_{14}$ and $A_{15}$ is a group of the formula (IV);

e) a compound of the formula (VII)

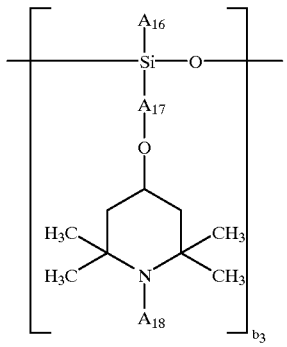

(VII)

in which
$A_{16}$ is $C_1$–$C_{10}$alkyl, $C_5$–$C_{12}$cycloalkyl, $C_1$–$C_4$alkyl-substituted $C_5$–$C_{12}$cycloalkyl or phenyl,
$A_{17}$ is $C_3$–$C_{10}$alkylene,
$A_{18}$ is as defined for $A_1$ and
$b_3$ is a number from 1 to 50;

f) a product obtained by reacting an intermediate product, obtained by reaction of a polyamine of the formula (VIII-a) with cyanuric chloride, with a compound of the formula (VIII-b)

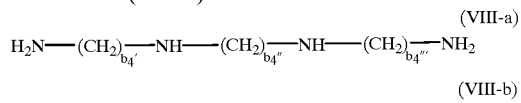

(VIII-a)

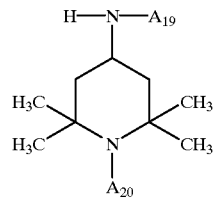

(VIII-b)

in which
$b_4'$, $b_4''$ and $b_4'''$ independently of one another are a number from 2 to 12,
$A_{19}$ is hydrogen, $C_1$–$C_{12}$alkyl, $C_5$–$C_{12}$cycloalkyl or phenyl and
$A_{20}$ is as defined for $A_1$;

g) a compound of the formula (IX)

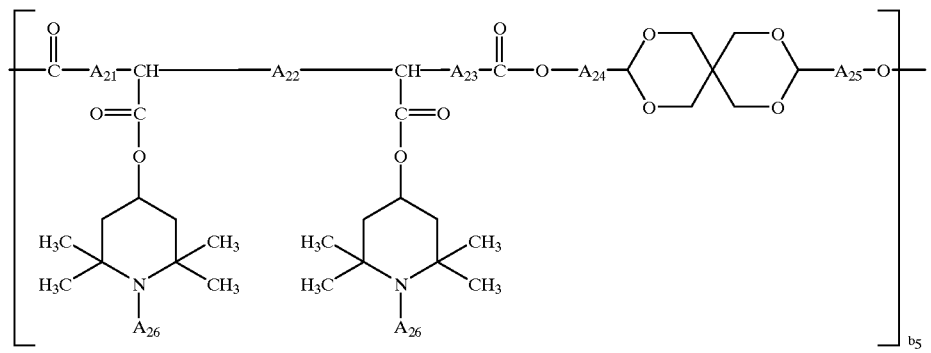

(IX)

in which $A_{21}$, $A_{22}$, $A_{23}$, $A_{24}$ and $A_{25}$ independently of one another are a direct bond or $C_1$–$C_{10}$alkylene,
$A_{26}$ is as defined for $A_1$ and
$b_5$ is a number from 1 to 50;

h) a compound of the formula (X)

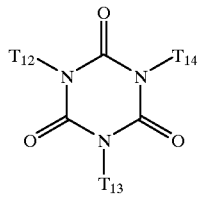
(X)

in which
$T_{12}$, $T_{13}$ and $T_{14}$ independently of one another are a group of the formula (XI)

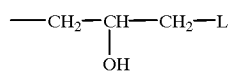
(XI)

in which L is a group of the formula (III);

i) a compound of the formula (XII)

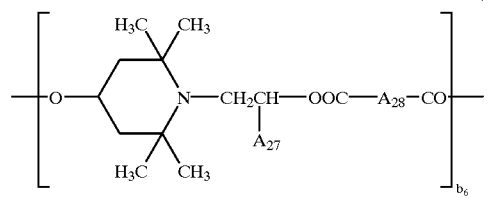
(XII)

in which $A_{27}$ is hydrogen or methyl,
$A_{28}$ is a direct bond or $C_1$–$C_{10}$alkylene and
$b_6$ is a number from 2 to 50;

j) a compound of the formula (XIII)

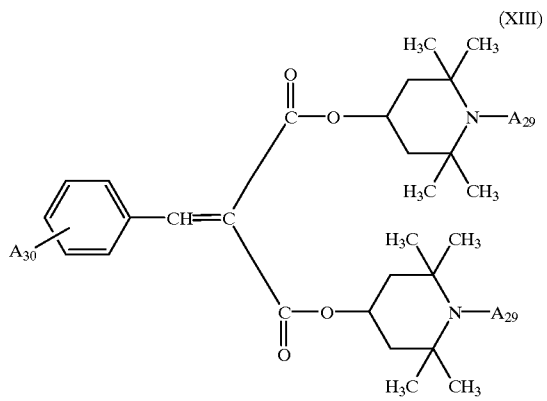
(XIII)

wherein $A_{29}$ is as defined for $A_1$ and
$A_{30}$ is hydrogen, $C_1$–$C_{12}$alkyl or $C_1$–$C_{12}$alkoxy;

k) a compound of the formula (XIV)

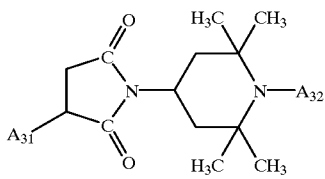
(XIV)

wherein $A_{31}$ is $C_1$–$C_{24}$alkyl and
$A_{32}$ is as defined for $A_1$; and l) a compound of the formula (XV)

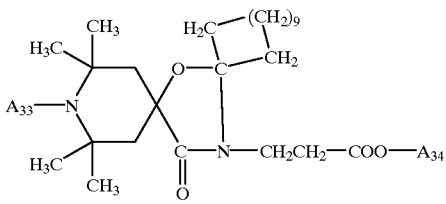
(XV)

wherein $A_{33}$ is as defined for $A_1$ and
$A_{34}$ is $C_1$–$C_{20}$alkyl or $C_2$–$C_{20}$alkenyl.

3. A method according to claim 2 wherein
$A_1$ is hydrogen or $C_1$–$C_4$alkyl,
$b_1$ is 2 or 4,
if $b_1$ is 2, $A_2$ is $C_2$–$C_8$alkylene or a group of the formula

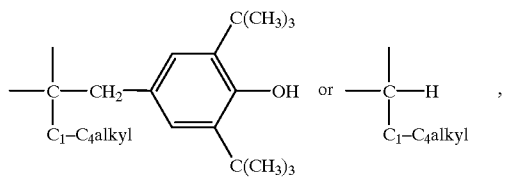

and
if $b_1$ is 4, $A_2$ is 1,2,3,4-butanetetrayl,
the radicals R independently of one another are
—COO—$C_{13}H_{27}$ or a group

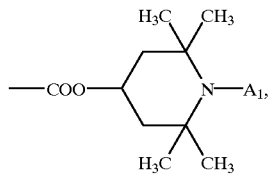

$A_3$ and $A_7$ independently of one another are hydrogen or $C_1$–$C_4$alkyl,
$A_4$, $A_5$ and $A_6$ independently of one another are $C_2$–$C_3$alkylene,
$T_1$, $T_2$, $T_3$, $T_4$, $T_5$, $T_6$, $T_7$ and $T_8$ independently of one another are a group of the formula (III) in which $A_8$ is hydrogen, $C_1$–$C_4$alkyl or a group of the formula (IV),
$A_{11}$, $A_{13}$, $A_{14}$ and $A_{15}$ independently of one another are hydrogen, $C_1$–$C_8$alkyl, cyclohexyl or a group of the formula (IV),
$A_{12}$ is $C_2$–$C_{10}$alkylene, or $A_{14}$ and $A_{15}$, together with the nitrogen atom to which they are attached, form morpholino,
$b_2$ is a number from 2 to 25,
$A_{16}$ is $C_1$–$C_4$alkyl, cyclohexyl or phenyl,
$A_{17}$ is $C_3$–$C_8$alkylene,
$b_3$ is a number from 2 to 25,
$b_4'$, $b_4''$ and $b_4'''$ independently of one another are a number from 2 to 3,
$A_{19}$ is hydrogen or $C_1$–$C_4$alkyl,
$A_{21}$, $A_{23}$, $A_{24}$ and $A_{25}$ independently of one another are $C_1$–$C_4$alkylene,
$A_{22}$ is a direct bond,
$b_5$ is a number from 1 to 20,
$A_{28}$ is $C_2$–$C_8$alkylene,
$b_6$ is a number from 2 to 25,
$A_{30}$ is $C_1$–$C_4$alkoxy,
$A_{31}$ is $C_{12}H_{25}$ and
$A_{34}$ is $C_{12}$–$C_{14}$alkyl.

4. A method according to claim 2 wherein the two different compounds containing a residue of the formula (A) are not covered by the same class.

5. A method according to claim 1 wherein the two different compounds containing a residue of the formula (A) are selected from the group consisting of the compounds of the formulae (Ia-1), (Ia-2), (Ia-3), (Ia-4), (Ia-5), (Ia-6), (Ib-1), (Ib-2), (II-1), (VI-1), (VI-2), (VI-3), (VII-1), (VIII-1), (IX-1), (IX-2), (XII-1), (XIII-1) and (XIV-1)

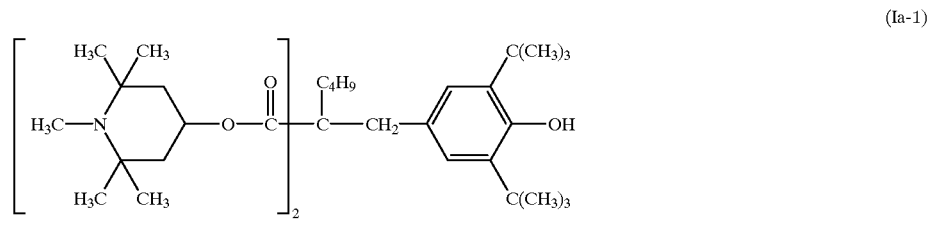
(Ia-1)

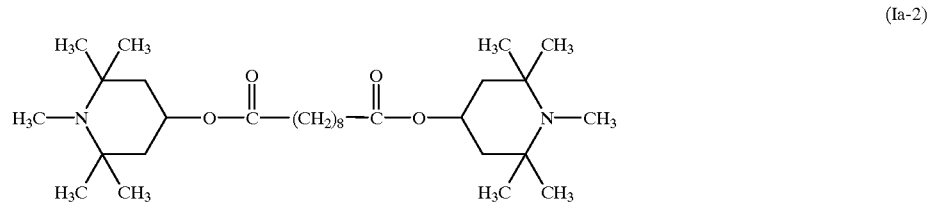
(Ia-2)

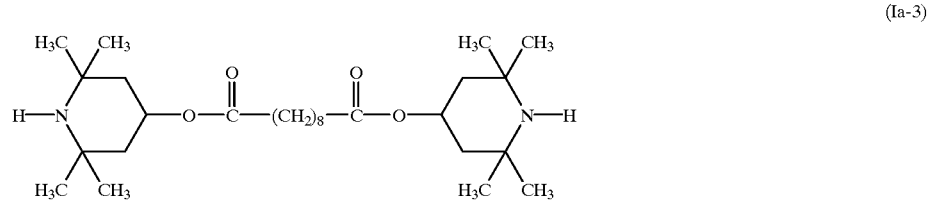
(Ia-3)

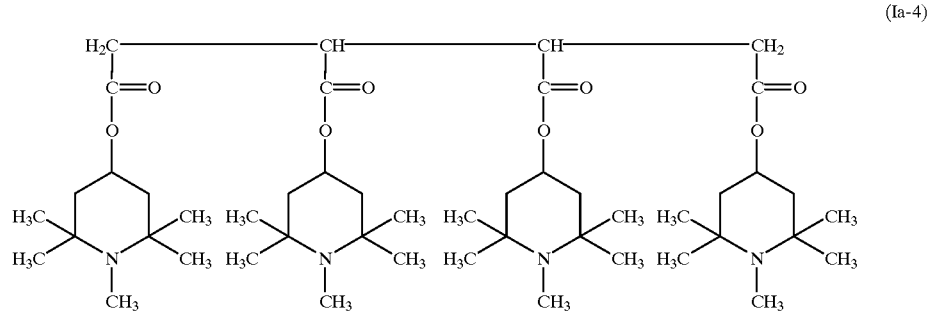
(Ia-4)

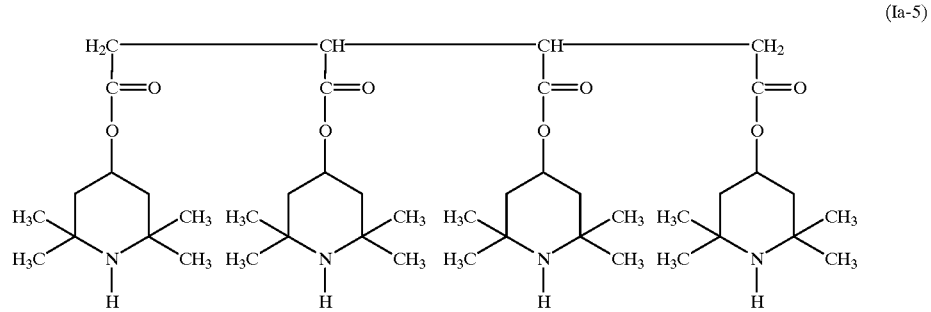
(Ia-5)

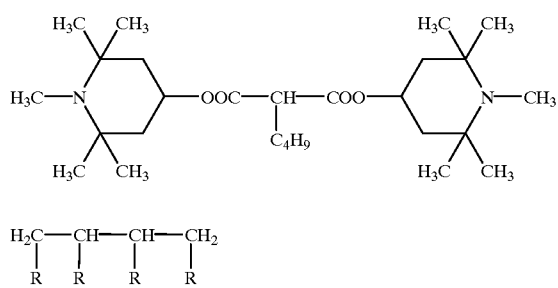
(Ia-6)
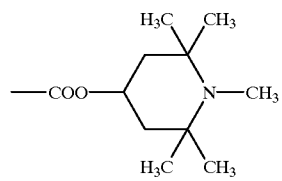
in which the radicals R are —COO—$C_{13}H_{27}$ and
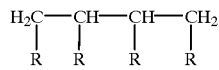
in a ratio of 1.7:2.3,
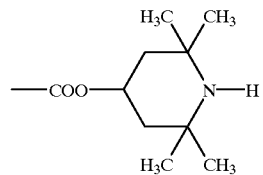
(Ib-2)
in which the radicals R are —COO—$C_{13}H_{27}$ and
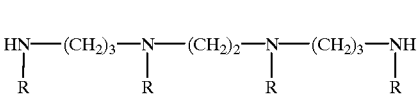
(Ib-1)
in a ratio of 1.7:2.3,
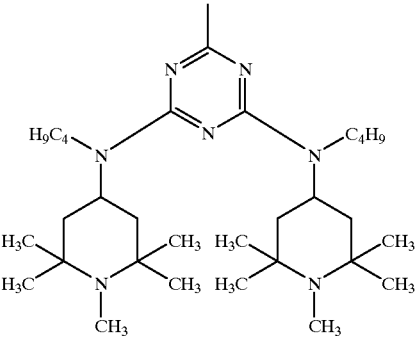
(II-1)
with R being the group
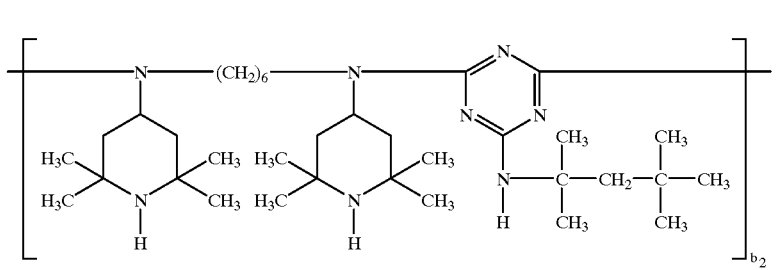
(VI-1)
with $b_2$ being a number from 2 to 25,

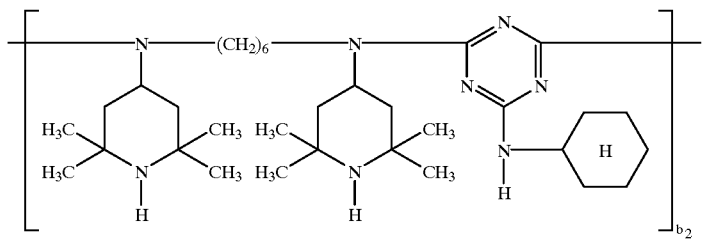
(VI-2)
with $b_2$ being a number from 2 to 25,
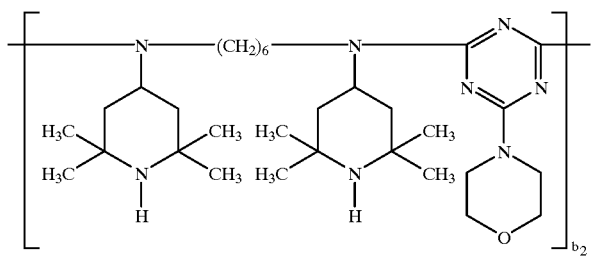
(VI-3)
with $b_2$ being a number from 2 to 25,
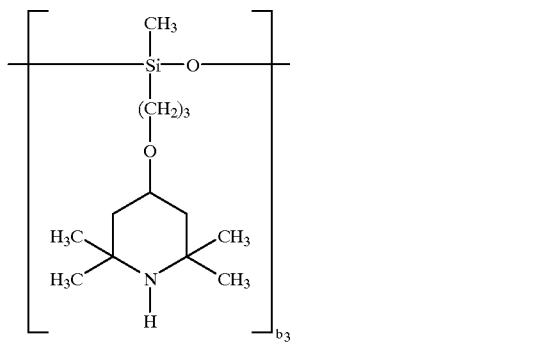
(VII-1)
with $b_3$ being a number from 2 to 25,
a product (VIII-1) obtainable by reacting an intermediate product, obtained by the reaction of the polyamine of the formula
$$H_2N-(CH_2)_3-NH-(CH_2)_2-NH-(CH_2)_3-NH_2$$
with cyanuric chloride, with the compound of the formula
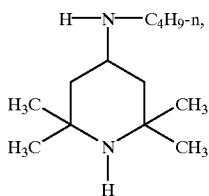
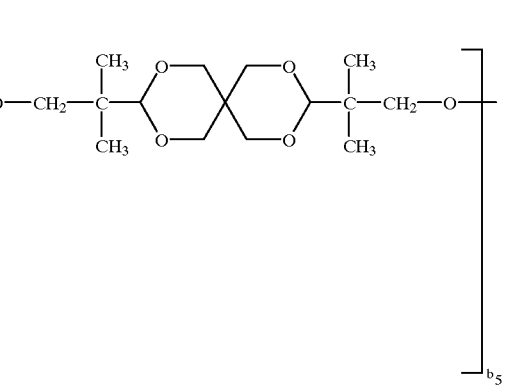
(IX-1)

with b₅ being a number from 1 to 20,

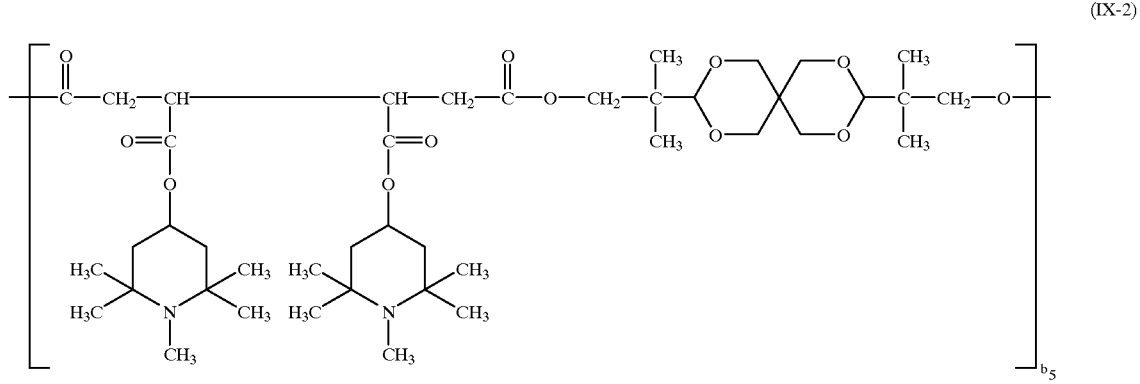

(IX-2)

with b₅ being a number from 1 to 20,

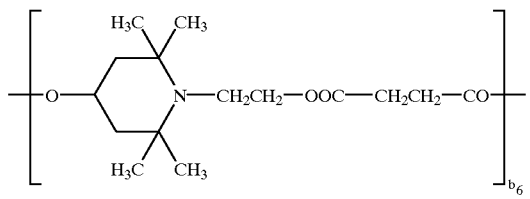

(XII-1)

with b₆ being a number from 2 to 25,

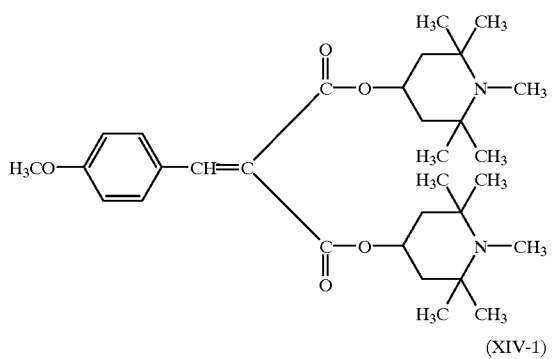

(XIII-1)

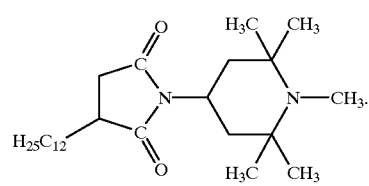

(XIV-1)

6. A method according to claim 5 wherein the two different compounds containing a residue of the formula (A) are selected from the group consisting of the compounds of the formulae (Ia-1), (Ia-2), (Ia-3), (Ia-6), (Ib-1), (II-1), (IX-2), (XII-1), (XIII-1), and (XIV-1).

7. A method according to claim 5 wherein the two different compounds containing a residue of the formula (A) are selected from the group consisting of the compounds of the formulae (Ia-1), (Ia-2), (Ia-3), (Ia-4), (Ia-5), (II-1), (VI-1), (XII-1) and (XIII-1).

8. A method according to claim 5 wherein the two different compounds containing a residue of the formula (A) are the compounds of the formulae (II-1) and (VI-1), the compounds of the formulae (II-1) and (XII-1), the compounds of the formulae (Ia-1) and (Ia-3), the compounds of the formulae (Ia-2) and (II-1) or the compounds of the formulae (Ia-3) and (II-1).

9. A method according to claim 1 in which the organic film-forming binder is a polyester or polyacrylate resin together with a crosslinking agent, or an epoxy resin, or combinations of these resins.

10. A method according to claim 9 wherein the crosslinking agent is an epoxy resin, triglycidylisocyanurate, glycoluril, hydroxyalkylamide, uretdione or blocked polyisocyanate.

11. A powder coating composition containing 1) an organic film-forming binder, and 2) at least two different compounds containing a residue of the formula (A)

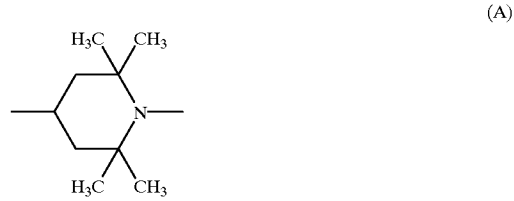

(A)

as electron donors,
characterized in that the powder coating composition has a charge/mass ratio of at least 200 μC/kg.

12. A powder coating composition according to claim 11 wherein the powder coating has a charge/mass ratio of 200 μC/kg to 10000 μC/kg.

13. A method for charging a powder coating composition containing 1) an organic film-forming binder, and 2) at least two different compounds containing a residue of the formula (A)

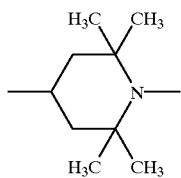

(A)

as electron donors,
which method comprises charging the powder coating composition with a charge/mass ratio of at least 200 μC/kg in a tribo charging gun.

14. A powder coating composition containing
 1) an organic film-forming binder, and
 2) at least two different compounds selected from the group consisting of the compounds of the formulae (Ia-4), (Ib-1), (Ib-2), (II-1), (VI-1), (VI-2), (VI-3), (VII-1), (VIII-1), (IX-1), (IX-2) and (XII-1) as defined in claim 5.

15. A powder coating composition according to claim 14, wherein the two different compounds of the component 2) are the compounds of the formulae (II-1) and (XII-1).

* * * * *

UNITED STATES PATENT AND TRADEMARK OFFICE
CERTIFICATE OF CORRECTION

PATENT NO. : 6,113,980
DATED : SEPTEMBER 5, 2000
INVENTOR(S) : HUGH STEPHEN LAVER ET AL.

It is certified that error appears in the above-identified patent and that said Letters Patent is hereby corrected as shown below:

On the title page, Section [30] should read:

-- [30]     Foreign Application Priority Data

Jan. 31, 1997   [EP]   European Pat. Off. ..........97810046 --.

Signed and Sealed this

Twenty-fourth Day of April, 2001

Attest:

NICHOLAS P. GODICI

Attesting Officer

Acting Director of the United States Patent and Trademark Office